United States Patent
Park et al.

(10) Patent No.: US 10,789,250 B2
(45) Date of Patent: *Sep. 29, 2020

(54) NON-INTRUSIVE MONITORING OUTPUT OF STAGES IN MICRO-BATCH STREAMING

(71) Applicant: Oracle International Corporation, Redwood Shores, CA (US)

(72) Inventors: Hoyong Park, San Jose, CA (US); Sandeep Bishnoi, Mill Valley, CA (US); Prabhu Thukkaram, San Ramon, CA (US); Santosh Kumar, Bangalore (IN); Pavan Advani, Bangalore (IN); Kunal Mulay, Madhya Pradesh (IN); Jeffrey Toillion, Half Moon Bay, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 15/706,407

(22) Filed: Sep. 15, 2017

(65) Prior Publication Data

US 2018/0075100 A1  Mar. 15, 2018

(30) Foreign Application Priority Data

Sep. 15, 2016  (IN) .............................. 201641031479

(51) Int. Cl.
*G06F 17/30* (2006.01)
*G06F 16/2453* (2019.01)
(Continued)

(52) U.S. Cl.
CPC .... *G06F 16/24542* (2019.01); *G06F 11/3003* (2013.01); *G06F 16/113* (2019.01); (Continued)

(58) Field of Classification Search
CPC ......... G06F 16/24542; G06F 16/24568; G06F 16/90335; G06F 16/113; G06F 16/128; (Continued)

(56) References Cited

U.S. PATENT DOCUMENTS 6,633,867 B1  10/2003  Kraft et al.
6,986,019 B1   1/2006  Bagashev et al.
(Continued)

FOREIGN PATENT DOCUMENTS

CN  1689298  10/2005
CN  101957832  1/2011
(Continued)

OTHER PUBLICATIONS

U.S. Appl. No. 14/079,538, Final Office Action dated Feb. 27, 2019, 10 pages.
(Continued)

*Primary Examiner* — Huawen A Peng
(74) *Attorney, Agent, or Firm* — Kilpatrick Townsend & Stockton LLP

(57) ABSTRACT

An event processing system for processing events in an event stream is disclosed. The system can execute instructions to receive a continuous query, apply a transformation to the continuous query to generate a query plan for the continuous query, monitor the continuous query using a monitoring transformation process, receive a micro-batch stream of input events related to an application, and process the input events of the micro-batch stream based at least in part on the monitoring transformation process to generate a set of output events related to the application.

17 Claims, 11 Drawing Sheets

(51) Int. Cl.
   *G06F 16/13*       (2019.01)
   *G06F 16/23*       (2019.01)
   *G06F 16/11*       (2019.01)
   *G06F 16/901*      (2019.01)
   *G06F 16/9032*     (2019.01)
   *G06F 16/2455*     (2019.01)
   *G06F 16/903*      (2019.01)
   *G06F 11/30*       (2006.01)

(52) U.S. Cl.
   CPC ............ *G06F 16/128* (2019.01); *G06F 16/13* (2019.01); *G06F 16/23* (2019.01); *G06F 16/24568* (2019.01); *G06F 16/9024* (2019.01); *G06F 16/9032* (2019.01); *G06F 16/90335* (2019.01); *G06F 16/90344* (2019.01)

(58) Field of Classification Search
   CPC ........... G06F 16/9032; G06F 16/90344; G06F 16/23; G06F 16/13; G06F 16/9024; G06F 11/3003
   See application file for complete search history.

(56) References Cited

U.S. PATENT DOCUMENTS

| | | |
|---|---|---|
| 7,139,977 B1 | 11/2006 | Russell |
| 7,284,041 B2 | 10/2007 | Nakatani et al. |
| 7,546,284 B1 | 6/2009 | Martinez et al. |
| 8,190,738 B2 | 5/2012 | Ruehle |
| 8,195,648 B2 | 6/2012 | Zabback et al. |
| 8,260,803 B2 | 9/2012 | Hsu et al. |
| 8,713,038 B2 | 4/2014 | Cohen et al. |
| 8,918,371 B1 | 12/2014 | Prikhodko et al. |
| 9,286,352 B2 | 3/2016 | Park et al. |
| 9,298,788 B1 * | 3/2016 | Kekre ................. G06F 11/1402 |
| 9,405,854 B2 | 8/2016 | Jerzak et al. |
| 9,424,150 B2 | 8/2016 | Jerzak et al. |
| 9,535,761 B2 | 1/2017 | Park et al. |
| 9,672,082 B2 | 6/2017 | Thukkaram et al. |
| 9,712,645 B2 | 7/2017 | De Castro Alves et al. |
| 9,894,147 B1 | 2/2018 | Zalpuri et al. |
| 9,934,263 B1 | 4/2018 | Black et al. |
| 9,972,103 B2 | 5/2018 | De Castro Alves et al. |
| 10,095,547 B1 | 10/2018 | Kulkarni et al. |
| 2002/0056004 A1 | 5/2002 | Smith et al. |
| 2005/0027698 A1 | 2/2005 | Collet et al. |
| 2005/0192921 A1 | 9/2005 | Chaudhuri et al. |
| 2006/0167869 A1 | 7/2006 | Jones |
| 2006/0218123 A1 | 9/2006 | Chowdhuri et al. |
| 2007/0168154 A1 | 7/2007 | Ericson |
| 2007/0250487 A1 | 10/2007 | Reuther |
| 2008/0072221 A1 | 3/2008 | Chkodrov et al. |
| 2008/0098370 A1 | 4/2008 | Fontoura et al. |
| 2008/0133594 A1 | 6/2008 | Fotinatos et al. |
| 2008/0301135 A1 | 12/2008 | Alves et al. |
| 2009/0070786 A1 | 3/2009 | Alves et al. |
| 2009/0089078 A1 | 4/2009 | Bursey |
| 2009/0106190 A1 | 4/2009 | Srinivasan et al. |
| 2009/0106214 A1 | 4/2009 | Jain et al. |
| 2009/0125536 A1 | 5/2009 | Yanbing et al. |
| 2009/0125916 A1 | 5/2009 | Lu et al. |
| 2009/0216728 A1 | 8/2009 | Brainerd et al. |
| 2009/0292759 A1 | 11/2009 | Piper et al. |
| 2010/0022627 A1 | 1/2010 | Scherer |
| 2010/0125572 A1 | 5/2010 | Poblete et al. |
| 2011/0035253 A1 | 2/2011 | Mason et al. |
| 2011/0084967 A1 | 4/2011 | De Pauw et al. |
| 2011/0126201 A1 | 5/2011 | Iyer et al. |
| 2011/0196891 A1 | 8/2011 | De Castro et al. |
| 2011/0213802 A1 | 9/2011 | Singh et al. |
| 2011/0302164 A1 | 12/2011 | Krishnamurthy et al. |
| 2012/0078951 A1 | 3/2012 | Hsu et al. |
| 2012/0131139 A1 | 5/2012 | Siripurapu et al. |
| 2012/0158783 A1 | 6/2012 | Nir et al. |
| 2012/0185584 A1 | 7/2012 | Pandit |
| 2012/0331333 A1 | 12/2012 | Imaki |
| 2013/0073586 A1 | 3/2013 | Aubry et al. |
| 2013/0080413 A1 | 3/2013 | Chen et al. |
| 2013/0262502 A1 | 10/2013 | Majeed et al. |
| 2014/0006474 A1 | 1/2014 | White et al. |
| 2014/0059109 A1 | 2/2014 | Jugel |
| 2014/0095425 A1 | 4/2014 | Sipple |
| 2014/0095444 A1 | 4/2014 | Deshmukh et al. |
| 2014/0095446 A1 | 4/2014 | Deshmukh et al. |
| 2014/0156683 A1 | 6/2014 | De Castro |
| 2014/0172506 A1 | 6/2014 | Parsell et al. |
| 2014/0195559 A1 | 7/2014 | Ko et al. |
| 2014/0324530 A1 | 10/2014 | Thompson et al. |
| 2014/0372550 A1 | 12/2014 | Said et al. |
| 2015/0103837 A1 | 4/2015 | Dutta |
| 2015/0121175 A1 | 4/2015 | Schöning |
| 2015/0169786 A1 | 6/2015 | Zbigniew et al. |
| 2015/0363464 A1 | 12/2015 | Alves et al. |
| 2015/0381712 A1 | 12/2015 | De Castro et al. |
| 2016/0004751 A1 | 1/2016 | Lafuente Alvarez et al. |
| 2016/0063080 A1 | 3/2016 | Nano et al. |
| 2016/0085772 A1 | 3/2016 | Vermeulen et al. |
| 2016/0085810 A1 | 3/2016 | De Castro et al. |
| 2016/0232230 A1 | 8/2016 | Radivojevic |
| 2016/0239272 A1 | 8/2016 | Petri |
| 2016/0283610 A1 | 9/2016 | Simitsis et al. |
| 2016/0306827 A1 | 10/2016 | Dos Santos et al. |
| 2016/0328432 A1 | 11/2016 | Raghunathan |
| 2017/0024912 A1 | 1/2017 | De Castro et al. |
| 2017/0075693 A1 | 3/2017 | Bishop et al. |
| 2017/0116050 A1 | 4/2017 | Thukkaram et al. |
| 2017/0116289 A1 | 4/2017 | Deshmukh et al. |
| 2017/0228253 A1 | 8/2017 | Layman et al. |
| 2017/0339203 A1 | 11/2017 | Kekre et al. |
| 2018/0074870 A1 | 3/2018 | Park et al. |
| 2018/0075046 A1 | 3/2018 | Park et al. |
| 2018/0075099 A1 | 3/2018 | Park et al. |
| 2018/0075107 A1 | 3/2018 | Park et al. |
| 2018/0075125 A1 | 3/2018 | Stiel et al. |
| 2018/0075163 A1 | 3/2018 | Park et al. |
| 2018/0189389 A1 | 7/2018 | Baldini Soares et al. |

FOREIGN PATENT DOCUMENTS

| | | |
|---|---|---|
| JP | 2007513426 | 5/2007 |
| JP | 2011039820 | 2/2011 |
| JP | 2011059967 | 3/2011 |
| WO | 2014089190 | 6/2014 |
| WO | 2015191120 | 12/2015 |
| WO | 2017070354 | 4/2017 |
| WO | 2018052907 | 3/2018 |
| WO | 2018052908 | 3/2018 |
| WO | 2018053338 | 3/2018 |
| WO | 2018053343 | 3/2018 |
| WO | 2018169429 | 9/2018 |
| WO | 2018169430 | 9/2018 |

OTHER PUBLICATIONS

U.S. Appl. No. 14/079,538, Non-Final Office Action dated Jun. 20, 2018, 22 pages.

U.S. Appl. No. 15/700,862, Non-Final Office Action dated Nov. 9, 2018, 15 pages.

U.S. Appl. No. 15/700,862, Non-Final Office Action dated Jun. 10, 2019, 22 pages.

Chinese Application No. 201380063379.4, Office Action dated May 7, 2019, 10 pages (4 pages of Original Document and 6 pages of English Translation).

Chinese Application No. 201380063379.4, Office Action dated Oct. 9, 2018, 7 pages (3 pages of Original Document and 4 pages of English Translation).

Chinese Application No. 201580001992.2, Office Action dated Mar. 5, 2019, 21 pages (11 pages of Original Document and 10 pages of English Translation).

Chinese Application No. 201680053838.4, Office Action dated May 29, 2019, 10 pages (4 pages of Original Document and 6 pages of English Translation).

(56) References Cited

OTHER PUBLICATIONS

Chinese Application No. 201680053838.4, Office Action dated Jan. 16, 2019, 15 pages (7 pages of Original Document and 8 pages of English Translation).
European Patent Application No. 13815232.7, Office Action dated May 10, 2019, 5 pages.
European Patent Application No. 15708969.9, Office Action dated May 16, 2019, 5 pages.
Japanese Application No. 2016-521684, Office Action dated Jan. 22, 2019, 6 pages (3 pages of Original Document and 3 pages of English Translation).
Masud et al., A Multi-Partition Multi-Chunk Ensemble Technique to Classify Concept-Drifting Data Streams, Advances in Knowledge Discovery and Data Mining: 13th Pacific-Asia Conference, Available online at: https://www.utdallas.edu/~bhavani.thuraisingham/Publications/Conference-Papers/DM/C184_A_Multi-partition_Multi-chunk_Ensemble.pdf, Jul. 23, 2009, pp. 363-375.
Cluster Mode Overview- Spark 2.0.0 Documentation, Available at http://spark.apache.org:80/docs/2.0.0/cluster-overview.html https://web.archive.org/web/20160903162009, Sep. 3, 2016.
Distributed Systems—Event ordering in multi-stage processing, Retrieved from the Internet: http://cep4iot.blogspot.nl/2015/09/distributed-systems-event-ordering-in.html, Sep. 30, 2015, 2 pages.
Map Reduce, Wikipedia, The Free Encyclopedia, 2016, 11 pages.
Pig (programming tool), Wikipedia, The Free Encyclopedia, 2016, 4 pages.
Spark SQL, Data Frames and Datasets Guide—Spark 2.0.0 Documentation, Retrieved from Internet: http://spark.apache.org:SO/docs/2.0.0/sql-programming-guide.html https://web.archive.org/web/20160902190135, Sep. 2, 2016, 29 pages.
U.S. Appl. No. 14/079,538, Final Office Action dated Nov. 16, 2017, 26 pages.
U.S. Appl. No. 14/079,538, Final Office Action dated Jul. 27, 2016, 28 pages.
U.S. Appl. No. 14/079,538, Non-Final Office Action dated Mar. 31, 2017, 24 pages.
U.S. Appl. No. 14/079,538, Non-Final Office Action dated Oct. 22, 2015, 34 pages.
U.S. Appl. No. 14/302,031, Final Office Action dated Apr. 22, 2015, 23 pages.
U.S. Appl. No. 14/302,031, Non-Final Office Action dated Aug. 27, 2014, 19 pages.
U.S. Appl. No. 14/302,031, Notice of Allowance dated Nov. 3, 2015, 19 pages.
U.S. Appl. No. 14/610,971, Non-Final Office Action dated Dec. 19, 2016, 10 pages.
U.S. Appl. No. 14/610,971, Notice of Allowance dated Apr. 12, 2017, 11 pages.
U.S. Appl. No. 14/861,687, Non-Final Office Action dated Oct. 11, 2017, 10 pages.
U.S. Appl. No. 14/866,512, Final Office Action dated Sep. 13, 2017, 25 pages.
U.S. Appl. No. 14/866,512, Non-Final Office Action dated Apr. 10, 2017, 24 pages.
U.S. Appl. No. 14/866,512, Notice of Allowance dated Feb. 15, 2018, 5 pages.
U.S. Appl. No. 15/095,766, First Action Interview Pilot Program Pre-Interview Communication dated Feb. 28, 2017, 4 pages.
Alves et al., Getting Started with Oracle Complex Event Processing 11g, (chapters 1, 2, 4, 5, 6), Packet Publishing, Mar. 26, 2013.
Arasu et al., CQL: A language for Continuous Queries over Streams and Relations, Lecture Notes in Computer Science, vol. 2921, 2004, pp. 1-19.
Arasu et al., The CQL Continuous Query Language: Semantic Foundations and Query Execution, The VLDB Journal, vol. 15, Issue 2, Jun. 2006, pp. 121-142.
Balkesen et al., Scalable Data Partitioning Techniques for Parallel Sliding Window Processing over Data Streams, 8th International Workshop on Data Management for Sensor Networks, Aug. 29, 2011, pp. 1-6.
Barga et al., Coping with Variable Latency and Disorder in Distributed Event Streams, 26th IEEE International Conference on, Distributed Computing Systems Workshops, Jul. 4, 2006, pp. 33-33.
Bestehorn et al., Fault-tolerant Query Processing in Structured P2P-systems, Distributed and Parallel Databases, vol. 28, Issue. 1, Aug., 2010, pp. 33-66.
Brito et al., Speculative Out-Of-Order Event Processing With Software Transaction Memory, Proceedings of the Second International Conference on Distributed Event-Based Systems, Jul. 1, 2008, pp. 265-275.
Bulmofe et al., An analysis of dag-consistent distributed shared-memory algorithms, SPAA '96 Proceedings of the eighth annual ACM symposium on Parallel algorithms and architectures, Jun. 24, 1996, pp. 297-308.
Chinese Application No. 201380063379.4, Office Action dated Feb. 2, 2018, 13 pages.
Li et al., Event Stream Processing with Out-of-Order Data Arrival, IEEE, Distributed Computing Systems Workshops, Jan. 1, 2007, 9 pages.
Olston et al., Pig Latin: A Not-So-Foreign Language for Data Processing, SIGMOD, ACM 978-1-60558-102, Jun. 9-12, 2008, 12 pages.
Or, Understanding Your Apache Spark Application Through Visualization—The Databricks Blog, Retrieved from Internet::https://databricks.com/blog/2015/06/22/understanding-your-sparkapplication-through-visualization.html, Jun. 22, 2015, 6 pages.
Oracle Corporation, Oracle Fusion Middleware Developer's guide for Oracle Event Processing, 11g Release 2 (11.1.2.1.0), Retrieved from Internet: https://docs.oracle.com/cd/E37115_01/dev.1112/e27150.pdf, Feb. 1, 2015, pp. 1-79.
International Application No. PCT/RU2017/000135, International Search Report and Written Opinion dated Sep. 6, 2017, 11 pages.
International Application No. PCT/US2013/073086, International Preliminary Report on Patentability dated Jun. 18, 2015, 6 pages.
International Application No. PCT/US2013/073086, International Search Report and Written Opinion dated Mar. 14, 2014, 9 pages.
International Application No. PCT/US2015/016346, International Preliminary Report on Patentability dated Sep. 30, 2016, 6 pages.
International Application No. PCT/US2015/016346, International Search Report and Written Opinion dated May 4, 2015, 10 pages.
International Application No. PCT/US2015/016346, Written Opinion dated May 24, 2016, 5 pages.
International Application No. PCT/US2016/057924, International Preliminary Report on Patentability dated Jan. 16, 2018, 11 pages.
International Application No. PCT/US2016/057924, International Search Report and Written Opinion dated Jan. 17, 2017, 15 pages.
International Application No. PCT/US2016/057924, Written Opinion dated Oct. 26, 2017, 7 pages.
International Application No. PCT/US2016/057924, Written Opinion dated Sep. 27, 2017, 7 pages.
International Application No. PCT/US2017/051195, International Search Report and Written Opinion dated Nov. 8, 2017, 14 pages.
International Application No. PCT/US2017/051196, International Search Report and Written Opinion dated Nov. 7, 2017, 13 pages.
Sadana, Interactive Scatterplot for Tablets Retrieved from Internet: https://vimeo.com/97798460, 2014, 2 pages.
Yang et al., Map-Reduce-Merge, Simplified Relational Data Processing on Large Clusters, 2007, 12 pages.
International Application No. PCT/US2017/051887, International Preliminary Report on Patentability dated Mar. 28, 2019, 8 pages.
International Application No. PCT/US2017/051897, International Preliminary Report on Patentability dated Mar. 28, 2019, 9 pages.
Anonymous, "Spark Streaming Programming Guide- Spark 2.0.0 Documentation", available at http://spark.apache.org:80/docs/2.0.0/streaming-programming-guide.html https://web.archive.org/web/20160901055439/, Sep. 1, 2016,.
Chintapalli et al., "Benchmarking Streaming Computation Engines: Storm, Flink and Spark Streaming", IEEE International Parallel and Distributed Processing Symposium Workshops (IPDPSW), May 23, 2016, pp. 1789-1792.
"International Search Report and Written Opinion" issued in PCT/US2017/051887, dated Dec. 15, 2017, 12 pages.

(56) References Cited

OTHER PUBLICATIONS

"International Search Report and Written Opinion" issued in PCT/US2017/051897, dated Dec. 15, 2017, 17 pages.
"International Search Report and Written Opinion" issued in PCT/RU2017/000136, dated Sep. 6, 2017, 12 pages.
Salmon et al., "Design principles of a stream-based framework for mobility analysis", Geoinformatica, Springer, US, Boston, vol. 21, No. 2, Apr. 25, 2016, pp. 237-261.
Thomas et al., "Distback: A Low-overhead Distributed Back-up Architecture With Snapshot Support", Local&metropolitan Area Networks (LANMAN), 19TH IEEE Workshop on, IEEE, Apr. 10, 2013, pp. 1-6.
U.S. Appl. No. 15/706,329, Non-Final Office Action dated Nov. 13, 2019, 15 pages.
European Application No. 19190843.3, Extended European Search Report dated Nov. 20, 2019, 9 pages.
European Application No. 13815232.7, Summons to Attend Oral Proceedings dated Aug. 8, 2019, 6 pages.
European Application No. 16794796.9, Office Action dated Nov. 14, 2019, 6 pages.
U.S. Appl. No. 15/700,862, Notice of Allowance dated Jan. 30, 2020, 16 pages.
U.S. Appl. No. 15/706,329, Notice of Allowance dated Mar. 11, 2020, 10 pages.
Debbabi et al., Controlling Self-Organising Software Applications with Archetypes, IEEE, Available online at: https://ieeexploreleee.org/stamp/stamp.jsp?arnumber=6394112, Sep. 2012, 10 pages.
Herrmannsdoerfer et al., Model-Level Simulation for COLA, IEEE, Available online at: https://dl.acm.org/doi/pdf/10.1109/MISE.2009.5069895?download=true, May 2009, pp. 38-43.
Kodase et al., Transforming Structural Model to Runtime Model of Embedded Software with Real-Time Constraints, IEEE, Available online at: https://ieeexploreleee.org/stamp/stamp.jsp?arnumber=1186690, 2003, pp. 6.
Wang et al., Early-Stage Performance Modeling and Its Application for Integrated Embedded Control Software Design, Available online at: https://dl.acm.org/doi/pdf/10.1145/974043.974061? download=true, Jan. 2004, pp. 110-114.
U.S. Appl. No. 14/079,538, Non-Final Office Action dated Apr. 7, 2020, 13 pages.
U.S. Appl. No. 15/700,784, Non-Final Office Action dated Apr. 7, 2020, 14 pages.
U.S. Appl. No. 15/700,914, Non-Final Office Action dated Jun. 1, 2020, 9 pages.
U.S. Appl. No. 15/701,019, Non-Final Office Action dated Jun. 15, 2020, 9 pages.
U.S. Appl. No. 15/706,226, Non-Final Office Action dated May 1, 2020, 48 pages.
U.S. Appl. No. 16/559,913, Non-Final Office Action dated Jun. 15, 2020, 8 pages.
U.S. Appl. No. 16/559,907, Non-Final Office Action dated Jul. 10, 2020, 27 pages.

\* cited by examiner ('q1', 0, 0) -> /snapshot/mark-q1-0-0
('q1', 1, 0) -> /snapshot/mark-q1-1-0

FIG. 6A ('q1', 0) -> (0, /snapshot/mark-q1-0-0, full)
          (0, /snapshot/mark-q1-1-0, full)
          (1, /snapshot/mark-q1-0-1, not)

snapshots

FIG. 6B

NON-INTRUSIVE MONITORING OUTPUT OF STAGES IN MICRO-BATCH STREAMING

CROSS-REFERENCES TO RELATED APPLICATIONS

The present application claims priority and benefit from India Provisional Application No. 201641031479, filed Sep. 15, 2016, entitled "MANAGING SNAPSHOTS AND STATE WITH MICRO-BATCHING," the entire contents of which are incorporated herein by reference for all purposes.

This application is related to application Ser. No. 15/706,329, filed on Sep. 15, 2017, entitled "MANAGING SNAPSHOTS AND APPLICATION STATE Ind. MICRO-BATCH BASED EVENT PROCESSING SYSTEMS" and application Ser. No. 15/706,226, filed on Sep. 15, 2017, entitled "COMPLEX EVENT PROCESSING FOR MICRO-BATCH STREAMING," the entire contents of which are hereby incorporated by reference as if fully set forth herein.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's event processing needs.

BRIEF SUMMARY

Techniques are provided (e.g., a method, a system, non-transitory computer-readable medium storing code or instructions executable by one or more processors) for processing events of an event stream. In an embodiment, an event processing system is disclosed. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for processing of a micro-batching stream to support fully stateful query processing, including: receiving, by a computing device, a continuous query. The method also includes applying, by the computing device, a transformation to the continuous query to generate a query plan for the continuous query. The method also includes monitoring, by the computing device, the continuous query using a monitoring transformation process. The method also includes receiving, by the computing device, a micro-batch stream of input events related to an application. The method also includes processing, by the computing device, the input events of the micro-batch stream based at least in part on the monitoring transformation process to generate a set of output events related to the application. Other embodiments of this aspect include corresponding computer systems, apparatus, and computer programs recorded on one or more computer storage devices, each configured to perform the actions of the methods.

Implementations may include one or more of the following features. The method where the processing is performed using a continuous query processing engine, and the processing includes processing each of the input events incrementally to generate the output events. The method where transformation is a directly acyclic graph (dag) transformation. The method further including storing, by the computing device, the set of output events related to the application in an output queue; and transmitting, by the computing device, the output events in the output queue when all of the input events have been processed. The method where the micro-batch stream includes micro-batches of data or resilient distributed datasets (RDDs), and the dag transformation is a set of vertices and edges, where the vertices represent the RDDs and the edges represent an operation to be applied on the RDDs. The method where the processing each of the input events includes performing a computation on each of the input based at least in part on a transformed query plan. The method where the continuous query includes pattern matching. Implementations of the described techniques may include hardware, a method or process, or computer software on a computer-accessible medium.

One general aspect includes a system, including: a memory configured to store computer-executable instructions; and a processor configured to access the memory and execute the computer-executable instructions to. The system also includes receive a continuous query. The system also includes apply a transformation to the continuous query to generate a query plan for the continuous query. The system also includes monitor the continuous query using a monitoring transformation process. The system also includes receive a micro-batch stream of input events related to an application. The system also includes process the input events of the micro-batch stream based at least in part on the monitoring transformation process to generate a set of output events related to the application. Other embodiments of this aspect include corresponding computer systems, apparatus, and computer programs recorded on one or more computer storage devices, each configured to perform the actions of the methods.

Implementations may include one or more of the following features. The system where the processing is performed using a continuous query processing engine, and the processing includes processing each of the input events incrementally to generate the output events. The system where transformation is a directly acyclic graph (dag) transformation. The system where the computer-executable instructions are further executable to store the set of output events related to the application in an output queue; and transmit the output events in the output queue when all of the input events have been processed. The system where the micro-batch stream includes micro-batches of data or resilient distributed datasets (RDDs), and the dag transformation is a set of vertices and edges, where the vertices represent the RDDs and the edges represent an operation to be applied on the RDDs. The system where the processing each of the input events includes performing a computation on each of the input based at least in part on a transformed query plan. The system where the continuous query includes pattern matching. Implementations of the described techniques may include hardware, a method or process, or computer software on a computer-accessible medium.

One general aspect includes a computer-readable medium storing computer-executable code that, when executed by a processor, cause the processor to perform operations including: receiving a continuous query. The computer-readable medium also includes applying a transformation to the continuous query to generate a query plan for the continuous query. The computer-readable medium also includes monitoring the continuous query using a monitoring transformation process. The computer-readable medium also includes receiving a micro-batch stream of input events related to an application. The computer-readable medium also includes processing the input events of the micro-batch stream based at least in part on the monitoring transformation process to generate a set of output events related to the application. Other embodiments of this aspect include corresponding computer systems, apparatus, and computer programs recorded on one or more computer storage devices, each configured to perform the actions of the methods.

Implementations may include one or more of the following features. The computer-readable medium where the processing is performed using a continuous query processing engine, and the processing includes processing each of the input events incrementally to generate the output events. The computer-readable medium where transformation is a directly acyclic graph (dag) transformation. The computer-readable medium where the operations further include storing the set of output events related to the application in an output queue; and transmitting the output events in the output queue when all of the input events have been processed. The computer-readable medium where the micro-batch stream includes micro-batches of data or resilient distributed datasets (RDDs), and the dag transformation is a set of vertices and edges, where the vertices represent the RDDs and the edges represent an operation to be applied on the RDDs. The computer-readable medium where the continuous query includes pattern matching. Implementations of the described techniques may include hardware, a method or process, or computer software on a computer-accessible medium.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 6A is an exemplary data structure of a Map directory structure implemented in accordance with an embodiment of the present disclosure.

FIG. 6B is an exemplary data structure of a Map directory structure implemented in accordance with an embodiment of the present disclosure.

DETAILED DESCRIPTION

Figure 1:
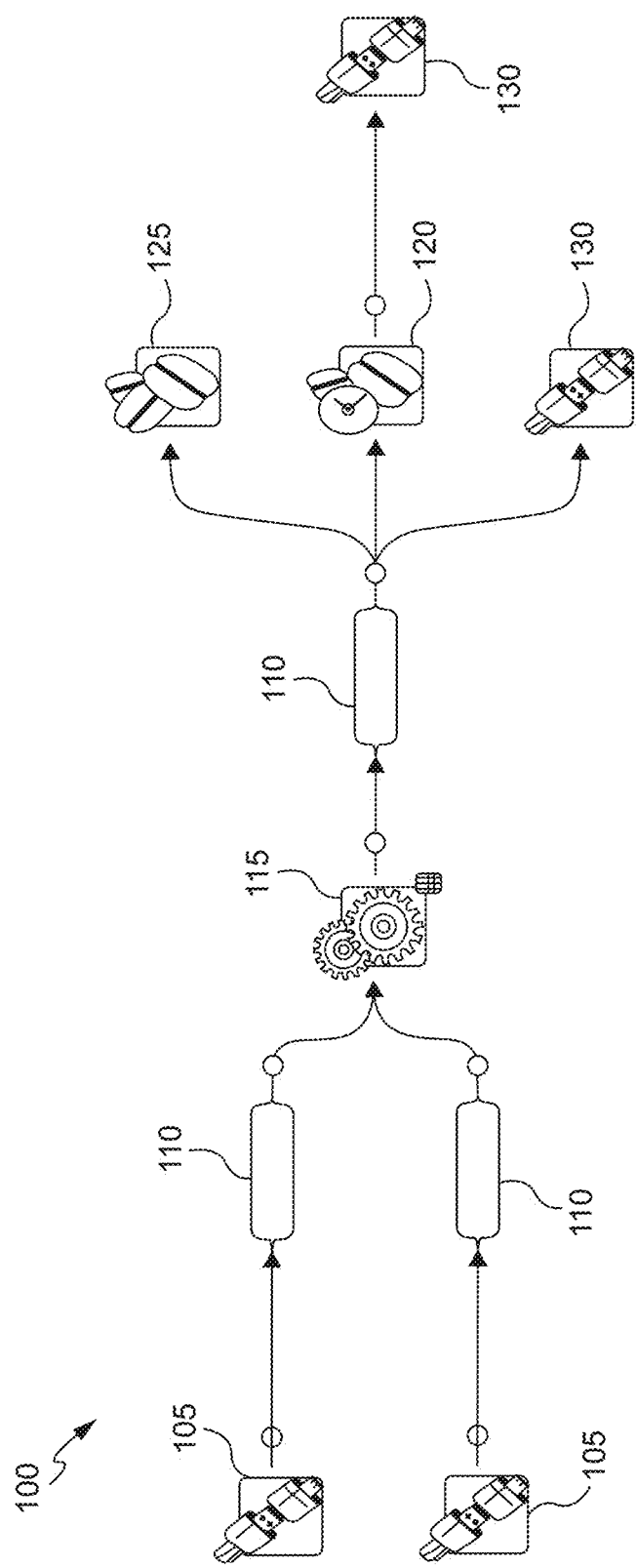
FIG. 1 is a graphical representation of an Event Processing Network in accordance with an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL) which allows applications to filter, query, and perform pattern matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation, that archived relation may also indicate that there are certain entities it can call to query for historical context, for example. In some examples, a data definition language (DDL) may indicate annotations about the archived relation such as, but not limited to, how do to the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, down-stream operators. So, one approach is to store this entire table here. However, utilizing archived relations, the system may analyze the query graph and decide which of the lowest stateful operator that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum(c1) from R1 where c2>c25, the plan for this query may look like: RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archived relation may be specified by a user. A window, in some aspects, in relation to an archived relation, may include a node in a query graph that analyzes or otherwise evaluates incoming streamed content. In other words, the window may define the amount of streamed content that be analyzed and/or processed by the query engine and/or the amount of historical data that will be included in the archived relation.

At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples which are within window limits may be output. Additionally, after state initialization, the value window may be applied on incoming active data. In some examples, only the incoming active data will be inserted into window whose window attribute's value is differing from current event time for less than the window size.

Additionally, in some examples, features of the present disclosure may also leverage the continuous query processing capabilities of the CQL engine and/or CEP engine to support real-time data analysis. In some aspects, the CQL engine and/or CEP engine may have traditionally been a stream-oriented analysis engine; however, it may be enhanced to support stream-oriented data that is backed by a durable store (e.g., the archived relation described above). For example, the present disclosure describes features that may support the notion of a data object (DO) which is a durable store (database and/or table). Modifications made to a DO may cause change notifications to be broadcast to interested listeners creating, in effect, a data stream. This data stream may be consumed by the CQL engine and/or CEP engine in support of any running queries; however, the CQL engine and/or CEP engine may not have been designed to take into account the existing data in the DO backing store. For example, the CQL engine and/or CEP engine may request that the initial state of the query running in the CQL engine and/or CEP engine reflect the current state of the DO including all the data currently in the DO backing store. Once this query is so initialized, the CQL engine and/or CEP engine only need to concern itself with the stream of DO change notifications from that point on in traditional stream-oriented style.

In some aspects, the CQL engine and/or CEP engine may traditionally process streams or non-archived relations, so there may be no initial state. For example, a query may be loaded, wherein it may start running and listening for changes, etc. In some cases, if a user asks for sales by state, in a bar chart, and then somebody makes a new sale, the table may get updated and the user may expect to see a change in the graph, pushed out to them. However, if they close the dashboard and come back a week later and bring up some sales, the user may expect to have the sum of sales according to the table of summed sales data. In other words, the query may need to bring the query up to the state of the archive and then listen for active changes.

In some aspects, for example, the CQL engine may be pre-initialized with the archived data. Once initialized, the CQL engine may listen to a Java Messaging Service (JMS) or other messenger for change notifications (e.g., based at least in part on API calls for inserting, deleting, etc., data from the archive). Thus, services can listen and if the JMS publishes on the same topic that the listening service is listening on, it may receive the data. The services don't have to know who is publishing or whether they are, or not. The listening service can just listen, and if something happens, the listening service may hear it. In some examples, this is how persistence is decoupled, for instance, from its consumers. Additionally, in some examples, an alert engine may raise alerts based on what the alert engine hears, potentially, and further, a SQL engine, that may be listening in on process queries of relevance to the listener.

In some examples, a query may be started in CQL, SQL, and/or CEP engine and instructions may be configured to get the archive data (e.g., to prime the pump) and then start listening to these JMS messages. However, with numerous inserts, deletes, etc., this could include a large amount of information. Additionally, there could be a lag time before the message is heard by the listener and the listening may, in some examples, jump in, query the archive, come back, and start listening. Thus, there is a potential for missing and/or double counting an event.

Additionally, if the engine merely runs the query, while it's running the query things can go into JMS and be published where the engine wasn't listening. So, the engine may be configured to setup the listener first, run the archive query, and then come back and actually start pulling out of the queue, so that it doesn't miss anything. Thus, the JMS may queue things up and, if things back up it's okay while the engine is doing a query because it can catch up later and it doesn't have to worry about whether it's synchronous. If it's not here, listening, it won't miss it, it just gets queued until the engine comes back, as long as it has its listener established.

Additionally, in some examples, a system column may be added to a user's data. This system column may be for indicating transaction IDs to attempt to handle the double counting and/or missing operation problem. However, in other examples, the system may provide or otherwise generate a transaction context table. Additionally, there may be two additional columns TRANSACTION_CID and TRANSACTION_TID. The context table may always be maintained by persistence service so as to know thread (context)wise of the last committed transaction ID. The transaction IDs may be guaranteed to be committed in ascending order for a thread (context). For example, when a server comes up, it may run the persistence service. Each one may allocate a set of context IDs and transaction IDs for determining whether data of the pre-initialized information includes all of the data that has passed through the JMS. Additionally, in some cases, multiple output servers may be utilized (in compliance with JTA and/or to implement high availability (HA), wherein each server may manage a single set of context/transaction tables that are completely separate from the other tables managed by the other servers.

In some embodiments, when a continuous (for example, a CQL) query is created or registered, it may undergo parsing and semantic analysis at the end of which a logical query plan is created. When the CQL query is started, for example, by issuing an "alter query <queryname> start" DDL, the logical query plan may be converted to a physical query plan. In one example, the physical query plan may be represented as a directed acyclic graph (DAG) of physical operators. Then, the physical operators may be converted into execution operators to arrive at the final query plan for that CQL query. The incoming events to the CQL engine reach the source operator(s) and eventually move downstream with operators in the way performing their processing on those events and producing appropriate output events.

Event Processing Applications

The quantity and speed of both raw infrastructure and business events is exponentially growing in IT environments. Whether it is streaming stock data for financial services, streaming satellite data for the military or real-time vehicle-location data for transportation and logistics businesses, companies in multiple industries must handle large volumes of complex data in real-time. In addition, the explosion of mobile devices and the ubiquity of high-speed connectivity adds to the explosion of mobile data. At the same time, demand for business process agility and execution has also grown. These two trends have put pressure on organizations to increase their capability to support event-driven architecture patterns of implementation. Real-time event processing requires both the infrastructure and the application development environment to execute on event processing requirements. These requirements often include the need to scale from everyday use cases to extremely high velocities of data and event throughput, potentially with latencies measured in microseconds rather than seconds of response time. In addition, event processing applications must often detect complex patterns in the flow of these events.

The Oracle Stream Analytics platform targets a wealth of industries and functional areas. The following are some use cases:

Telecommunications: Ability to perform real-time call detail (CDR) record monitoring and distributed denial of service attack detection.

Financial Services: Ability to capitalize on arbitrage opportunities that exist in millisecond or microsecond windows. Ability to perform real-time risk analysis, monitoring and reporting of financial securities trading and calculate foreign exchange prices.

Transportation: Ability to create passenger alerts and detect baggage location in case of flight discrepancies due to local or destination-city weather, ground crew operations, airport security, etc.

Public Sector/Military: Ability to detect dispersed geographical enemy information, abstract it, and decipher high probability of enemy attack. Ability to alert the most appropriate resources to respond to an emergency.

Insurance: Ability to learn and to detect potentially fraudulent claims.

IT Systems: Ability to detect failed applications or servers in real-time and trigger corrective measures.

Supply Chain and Logistics: Ability to track shipments in real-time and detect and report on potential delays in arrival.

Real Time Streaming & Event Processing Analytics

With exploding data from increased number of connected devices, there is an increase in large volumes of dynamically changing data; not only the data moving within organizations, but also outside the firewall. High-velocity data brings high value, especially to volatile business processes. However, some of this data loses its operational value in a short time frame. Big Data allows the luxury of time in processing for actionable insight. Fast Data, on the other hand, requires extracting the maximum value from highly dynamic and strategic data. It requires processing much faster and facilitates taking timely action as close to the generated data as possible. The Oracle Stream Analytics platform delivers on Fast Data with responsiveness. Oracle Edge Analytics pushes processing to the network edge, correlating, filtering and analyzing data for actionable insight in real-time.

The Oracle Stream Analytics platform provides ability to join the incoming streaming events with persisted data, thereby delivering contextually aware filtering, correlation, aggregation and pattern matching. It delivers lightweight, out of the box adapters for common event sources. It also provides an easy-to-use adapter framework for custom adapter development. With this platform, organizations can identify and anticipate opportunities, and threats represented by seemingly unrelated events. Its incremental processing paradigm can process events using a minimum amount of resources providing extreme low latency processing. It also allows it to create extremely timely alerts, and detect missing or delayed events immediately, such as the following:

Correlated events: If event A happens, event B almost always follows within 2 seconds of it.

Missing or Out-of-Sequence events: Events A, B, C should occur in order. C is seen immediately after A, without B.

Causal events: Weight of manufactured items is slowly trending lower or the reading falls outside acceptable norms. This signals a potential problem or future maintenance need.

In addition to real-time event sourcing, the Oracle Stream Analytics platform design environment and runtime execution supports standards-based, continuous query execution across both event streams and persisted data stores like databases and high performance data grids. This enables the platform to act as the heart of intelligence for systems needing answers in microseconds or minutes to discern patterns and trends that would otherwise go unnoticed. Event Processing use cases require the speed of in-memory processing with the mathematical accuracy and reliability of standard database SQL. This platform queries listen to incoming event streams and execute registered queries continuously, in-memory on each event, utilizing advanced, automated algorithms for query optimization. While based on an in-memory execution model, however, this platform leverages standard ANSI SQL syntax for query development, thus ensuring accuracy and extensibility of query construction. This platform is fully compliant with the ANSI SQL '99 standard and was one of the first products available in the industry to support ANSI SQL reviewed extensions to standard SQL for real-time, continuous query pattern matching. The CQL engine optimizes the execution of queries within a processor leaving the developer to focus more on business logic rather than optimization.

The Oracle Stream Analytics platform allows for both SQL and Java code to be combined to deliver robust event processing applications. Leveraging standard industry terminology to describe event sources, processors, and event output or sinks, this platform provides a meta-data driven approach to defining and manipulating events within an application. Its developers use a visual, directed-graph canvas and palette for application design to quickly outline the flow of events and processing across both event and data sources. Developing the flow through drag and drop modeling and configuration wizards, the developer can then enter the appropriate metadata definitions to connect design to implementation. When necessary or preferred, with one click, developers are then able to drop into custom Java code development or use the Spring® framework directly to code advanced concepts into their application.

Event driven applications are frequently characterized by the need to provide low and deterministic latencies while handling extremely high rates of streaming input data. The underpinning of the Oracle Stream Analytics platform is a lightweight Java container based on an OSGi® backplane. It contains mature components from the WebLogic JEE application server, such as security, logging and work management algorithms, but leverages those services in a real-time event-processing environment. An integrated real-time kernel provides unique services to optimize thread and memory management supported by a JMX framework enabling the interaction with the container for performance and configuration. Web 2.0 rich internet applications can communicate with the platform using the HTTP publish and subscribe services, which enables them to subscribe to an application channel and have the events pushed to the client. With a small footprint this platform is a lightweight, Java-based container, that delivers faster time-to-production and lower total cost of ownership.

The Oracle Stream Analytics platform has the ability to handle millions of events per second with microseconds of processing latencies on standard, commodity hardware or optimally with Oracle Exalogic and its portfolio of other Engineered Systems. This is achieved through a complete "top-down" layered solution, not only with a design focus on high performance event processing use cases, but also a tight integration with enterprise-class real-time processing infrastructure components. The platform architecture of performance-oriented server clusters focuses on reliability, fault tolerance and extreme flexibility with tight integration into the Oracle Coherence technology and enables the enterprise to predictably scale mission-critical applications across a data grid, ensuring continuous data availability and transactional integrity.

In addition, this platform allows for deterministic processing, meaning the same events can be fed into multiple servers or the same server at different rates achieving the same results each time. This enables incredible advantages over systems that only rely on the system clock of the running server.

The techniques described above and below may be implemented in a number of ways and in a number of contexts. Several example implementations and contexts are provided with reference to the following figures, as described below in more detail. However, the following implementations and contexts are but a few of many.

Framework for Event by Event Processing in Micro-Batch Based Stream Processing Systems In recent years, data stream management systems (DSMs) have been developed that can execute queries in a continuous manner over potentially unbounded, real-time data streams. Among the new DSMs, these systems generally employ micro-batching based stream processing in order to provide a combination of batch processing and stream processing from a single framework. An example of such a system is a Spark Streaming application that runs on the Spark® platform. Micro-batching stream processing has some shortcomings due to the nature of the design of the system where stateful processing can be complex. One such shortcoming is not being able to perform a 'pattern matching' operation. Pattern matching is an important feature that is desirable that the Stream Processing system should support and Pattern Matching requires highly stateful processing in order to run state machines to detect patterns from an unbound stream of events.

By using the Oracle Stream Analytics Platform described above, the proposed solution combines stateful processing with micro-batching stream processing. Essentially, the solution combines Complex Event Processing (CEP) and Micro-batching stream processing. The stateful processing is processed by a CQL Engine, which is a continuous query processing engine written in Continuous Query Language (CQL). In order to support fully stateful query processing, in one embodiment, the CQL Query Engine is added into the micro-batching stream processing.

In an embodiment, a CQL transformation algorithm is disclosed that can be added to a Directly Acyclic Graph (DAG) transformation. In certain embodiments, the transformation algorithm may be implemented as follows: (i) the driver from a stream processing application launches the CQLEngine to one or more of Executors as long running tasks which never return; (ii) the CQLEngines keep running and maintain the query state; (iii) on each micro-match job, CQL Transformation runs as part of the micro-batch job; (iv) when the CQL Transformation gets executed, the input events of a micro-batch are sent to the CQLEngine; the CQLEngine handles each event in the micro-batch event-by-event, performs incremental computation for the queries, and creates output events; (v) the output events are captured in a queue while the events in the micro-batch are processed; (vi) after every event in the micro-batch is completed with the CQLEngine, the output events in the result queue are returned as the result of the CQL Transformation; and (vii) the next transformation of the CQL Transformation can consume the output events with no additional transformations.

The disclosed CQL transformation algorithm/process provides the ability to add the CQL transformation to process CQL in a general stream processing system. Additionally, by using the CQL engine, the functional processing and the stateful processing can be combined. The disclosed process solves several shortcomings of micro-batching based stream processing by adding complex event processing. Also, by using incremental computation of CEP technology, some of the analysis can be performed more efficiently.

FIG. 1 is a graphical representation of an Event Processing Network (EPN), that may incorporate an embodiment of the present disclosure. As illustrated in FIG. 1, the EPN 100 may be made up of several stages that each serve a distinct role in the processing of events in an event stream. Events are by definition time-based, so a stream is that sense the natural condition of events. It is how event data arrives at an Oracle Event Processing application. To process events with Oracle Event Processing, an application is built whose core is an EPN such as EPN 100. The EPN 100 is made up of stages that each serve a distinct role in processing events, from receiving event data to querying the data to executing logic based on what is discovered about the events. The application receives raw event data, binds the data to event types, then routes the events from stage to stage for processing. Connected stages in an EPN provide a way to execute different kinds of code against events passing through the EPN. Kinds of stages can include an adapter, a processor, and a bean. More specifically, in various embodiments, the EPN 100 includes event sources 105 that receive events, channels 110 that connect stages, processors 115 such as a CQL processor that contain query code in Continuous Query Language (CQL), and beans 120, code 125, and/or sinks 130 that perform general processing logic. As described herein, a stream of events is in sequential order by time—one after the other.

In some embodiments, event sources 105 include, without limitation, an adapter (e.g., JMS, HTTP, and file), a channel, a processor, a table, a cache, and the like. For example the event source 105 may include one or more adapters. The one or more adapters may interface directly to an input and output stream and relation sources and sinks. The one or more adapters may be configured to understand the input and output stream protocol, and are responsible for converting the event data into a normalized form that can be queried by an application processor. For example, an adapter could receive event data and bind it to an event type instance, then pass the event along to a processor 115. The one or more adapters may be defined for a variety of data sources and sinks. The channels 110 act as event processing endpoints. Among other things, the channels 110 are responsible for queuing event data until an event processing agent can act upon the event data. The processors 115 may be event processing agents configured to perform action upon the event data such as the execution of queries on the event data. In certain embodiments, the processors 115 comprise a CQL processor that may be associated with one or more CQL queries that operate on the events offered by an input channel (e.g., a channel 110). For example, the processor's CQL code can query the events (as SQL code queries database rows), looking for particular patterns in the data as it flows through the EPN 100. The CQL processor may be connected to an output channel (e.g., a channel 110) to which query results are written. For example, events that meet the pattern criteria could be passed along to a bean 120 (e.g., written in Java) or code 125, where the data could be used in a calculation with data retrieved from an external source. A further downstream bean 120 or code 125 could use the calculation result to execute a process using an external component. The beans 120 or code 125 may be registered to listen to the output channel, and are triggered by the insertion of a new event into the output channel. In some embodiments, the processing logic for the beans 120 may be written in a programming language such as Java or a plain-old-Java-object (POJO). In some embodiments, the processing logic may use the Oracle CEP event bean API so that the bean can be managed by Oracle CEP. Any component designed to receive or send events in the EPN 100 (such as EPN stages) may be been implemented specifically to do so. Components that are able to receive events are known as event sinks 130, while components that send events are known as event sources 105. A single component could be both an event source and a sink. The described stage components included in Oracle Event Processing, such as adapters and the components on which CQL processors are based, already support required functionality. Developers can add event sink and source support to beans, new adapters, and other code they write by implementing interfaces from the OEP API.

Figure 2:
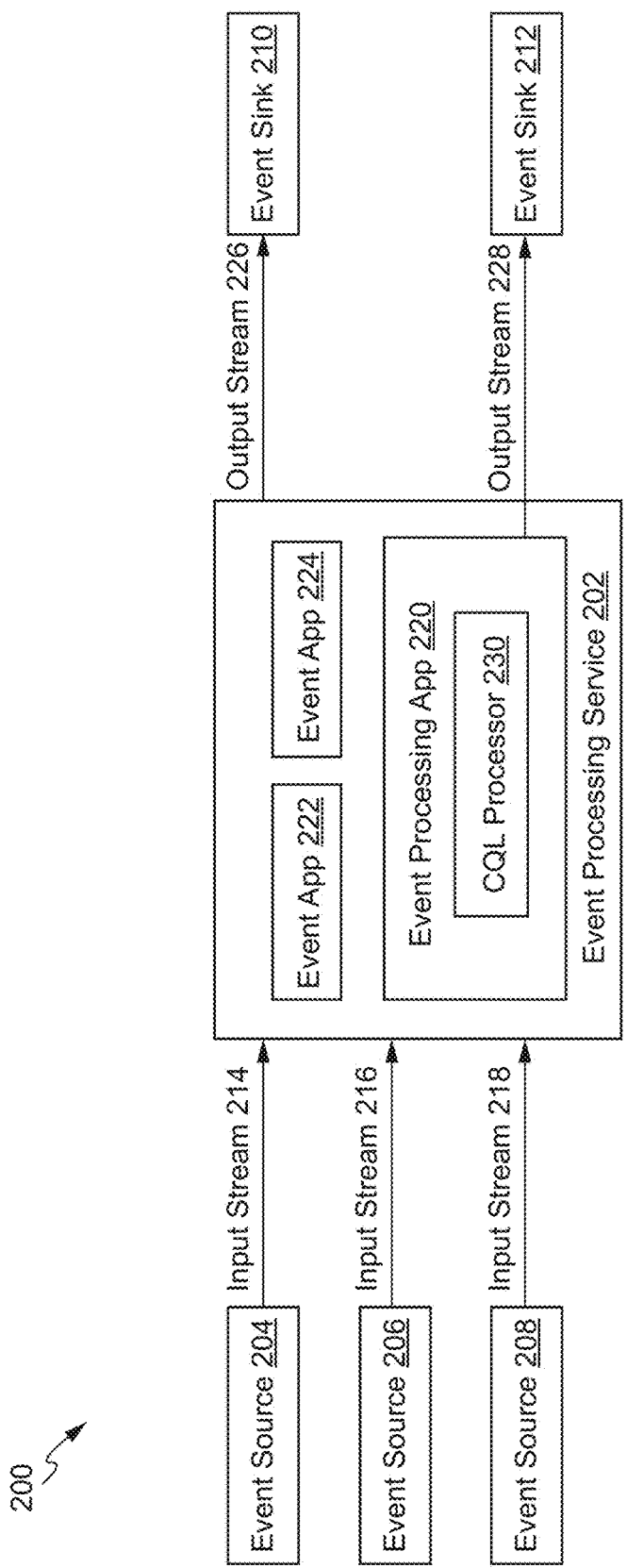
FIG. 2 depicts a simplified high level diagram of an event processing system in accordance with an embodiment of the present disclosure.

FIG. 2 depicts a simplified high level diagram of an event processing system 200 that may incorporate an embodiment of the present disclosure. Event processing system 200 may comprise one or more event sources (204, 206, 208), an event processing service (EPS) 202 (also referred to as CQ Service 202) that is configured to provide an environment for processing event streams, and one or more event sinks (210, 212). The event sources generate event streams that are received by EPS 202. EPS 202 may receive one or more event streams from one or more event sources. For example, as shown in FIG. 2, EPS 202 receives a first input event stream 214 from event source 204, a second input event stream 216 from event source 206, and a third event stream 218 from event source 208. One or more event processing applications (220, 222, and 224) may be deployed on and be executed by EPS 202. An event processing application executed by EPS 202 may be configured to listen to one or more input event streams, process the events received via the one or more event streams based upon processing logic that selects one or more events from the input event streams as notable events. The notable events may then be sent to one or more event sinks (210, 212) in the form of one or more output event streams. For example, in FIG. 2, EPS 202 outputs a first output event stream 226 to event sink 210, and a second output event stream 228 to event sink 212. In certain embodiments, event sources, event processing applications, and event sinks are decoupled from each other such that one can add or remove any of these components without causing changes to the other components.

In one embodiment, EPS 202 may be implemented as a Java server comprising a lightweight Java application container, such as one based upon Equinox OSGi, with shared services. In some embodiments, EPS 202 may support ultra-high throughput and microsecond latency for processing events, for example, by using JRockit Real Time. EPS 202 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 2 provides a drilldown for one such event processing application 220. As shown in FIG. 2, event processing application 220 is configured to listen to input event stream 218, execute a continuous query 230 comprising logic for selecting one or more notable events from input event stream 218, and output the selected notable events via output event stream 228 to event sink 212. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 220 in FIG. 2 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 202 without having to store all the received events data. Accordingly, EPS 202 provides a special querying mechanism that enables processing of events to be performed as the events are received by EPS 202 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 202 for a particular event stream may be executed each time that an event is received in that event stream. As part of the continuous query execution, EPS 202 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(2) One or more application processors (or event processing agents) are configured to consume normalized event data from a channel, process it using queries to select notable events, and forward (or copy) the selected notable events to an output channel.

(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 200 depicted in FIG. 2 may have other components than those depicted in FIG. 2. Further, the embodiment shown in FIG. 2 is only one example of a system that may incorporate an embodiment of the present disclosure. In some other embodiments, system 200 may have more or fewer components than shown in FIG. 2, may combine two or more components, or may have a different configuration or arrangement of components. System 200 can be of various types including a service provider computer 106 described in FIG. 1, a personal computer, a portable device (e.g., a mobile telephone or device), a workstation, a network computer, a mainframe, a kiosk, a server, or any other data processing system. In some other embodiments, system 200 may be configured as a distributed system where one or more components of system 200 are distributed across one or more networks in the cloud.

The one or more of the components depicted in FIG. 2 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 3:
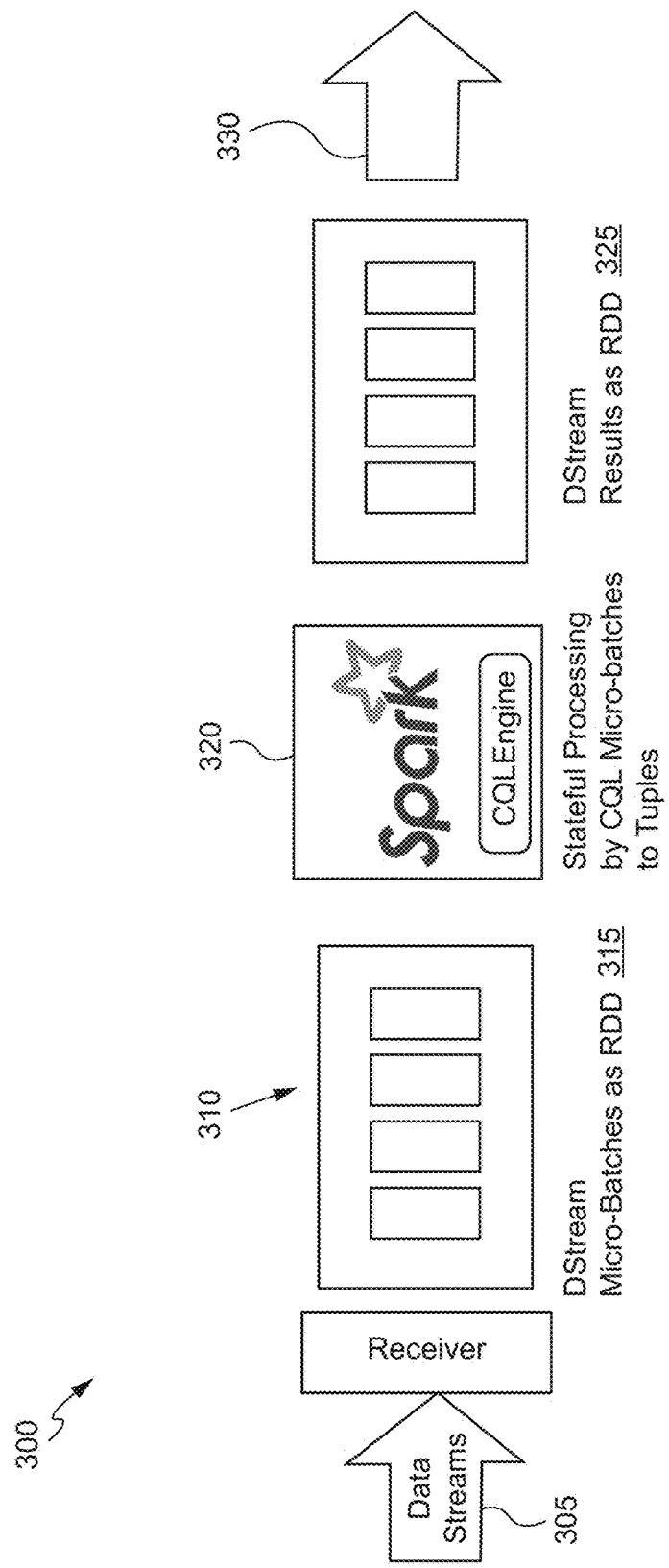
FIG. 3 is an example system or architecture in which a stream processing application configured for stateful processing with micro-batching stream processing can be implemented in accordance with an embodiment of the present disclosure.

FIG. 3 is an example system or architecture in which a stream processing application 300 configured for stateful processing with micro-batching stream processing can be implemented. In various embodiments, stream processing application 300 includes one or more data streams 305. The data streams 305 represent data that is changing constantly, often exclusively through insertions of new elements. Many types of applications generate data streams 305 as opposed to data sets, including sensor data applications, financial tickers, network performance measuring tools, network monitoring and traffic management applications, and clickstream analysis tools. In some embodiments, Spark Streaming is the incremental micro-batching stream processing framework 310 for Spark, and Spark Streaming offers the data abstraction called Discretized Stream (Dstream) 315 that hides the complexity of dealing with a continuous data stream and makes it as easy for programmers as using one single RDD at a time. DStream is basically a stream of Resilient Distributed Datasets (RDDs) with elements being the data received from input streams for batch (possibly extended in scope by windowed or stateful operators). RDDs are a fundamental data structure of Spark. It is an immutable distributed collection of objects. Each dataset in RDD is divided into logical partitions, which may be computed on different nodes of the cluster. RDDs can contain any type of Python, Java, or Scala objects, including user-defined classes. In the micro-batching performed by the stream processing framework 310 a batch is essentially one RDD at a time. Accordingly, instead of processing the data streams 305 one record at a time, Spark Streaming's Receivers accept data in parallel and buffer it in the memory of Spark's workers nodes. Then the latency-optimized Spark engine runs short tasks (tens of milliseconds) to process the batches and output the results to other systems.

The stream processing application 300 further includes a CQL Engine 320. The stateful processing necessary to detect patterns from an unbound stream of events such as within the Discretized Stream 315 is processed by the CQL Engine 320, which is a continuous query processing engine written in CQL. In order to support fully stateful query processing, in one embodiment, the CQL Engine 320 is added into the micro-batching stream processing for the events or data within the Discretized Stream 315. The CQL Engine 320 optimizes the execution of stateful query processing within a processor such as a CQL processor using a CQL transformation algorithm that can be added to a DAG transformation. The transformation algorithm takes the Discretized Stream 315 as input and in combination with the CQL processor helps generate a result 325. As should be understood, there are two types of operations that can be done on an RDD to obtain a result: (i) transformations like, map, filter that results in another RDD 325, and (ii) actions like count that result in an output. A spark job typically comprises of a DAG of tasks executing transformations and actions on RDD. The CQL processor code can query the events within the Discretized Stream 315, looking for particular patterns in the data as it flows through an EPN (e.g., EPN 100 as described with respect to FIG. 1). Events that meet the pattern criteria could be passed along as the result 325 to a bean, code, or sink, where eventually the result 325 could be used passed along as input 330 for in a calculation with data retrieved from an external source.

Figure 4:
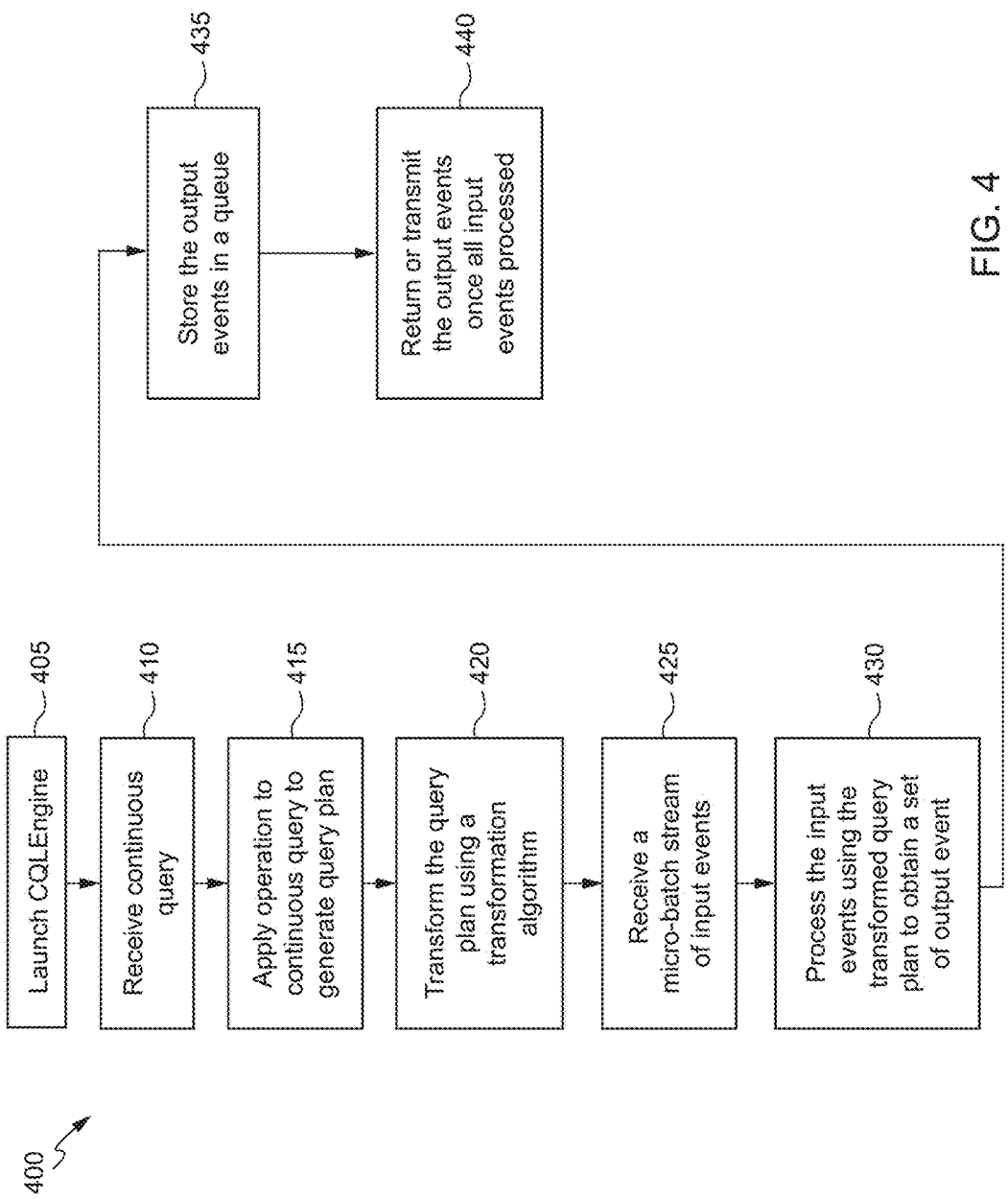
FIG. 4 shows a flowchart that illustrates processing of a micro-batching stream in accordance with an embodiment of the present disclosure.
Figure 7:
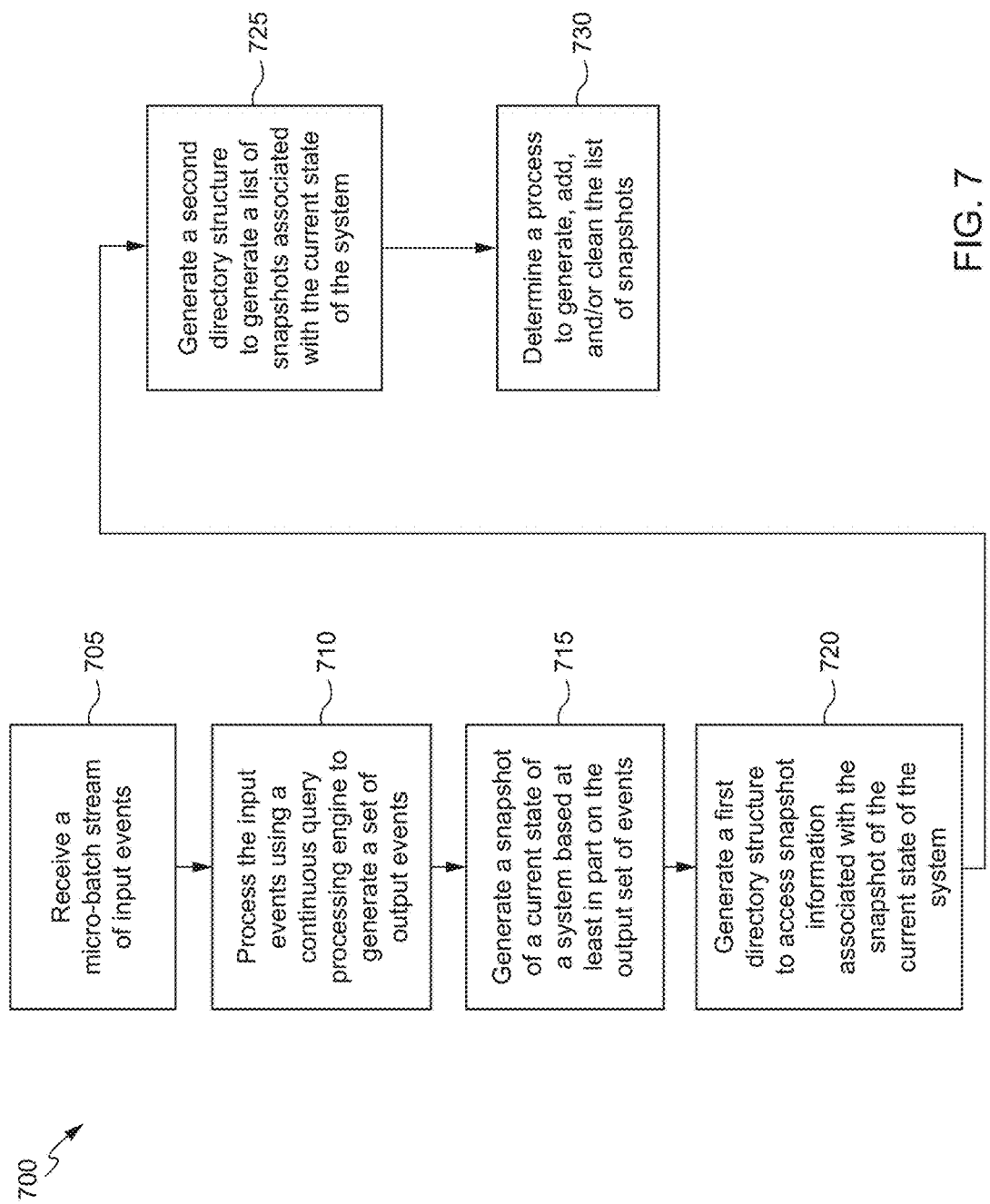
FIG. 7 shows a flowchart that illustrates processing of a micro-batching stream in accordance with an embodiment of the present disclosure.
Figure 8:
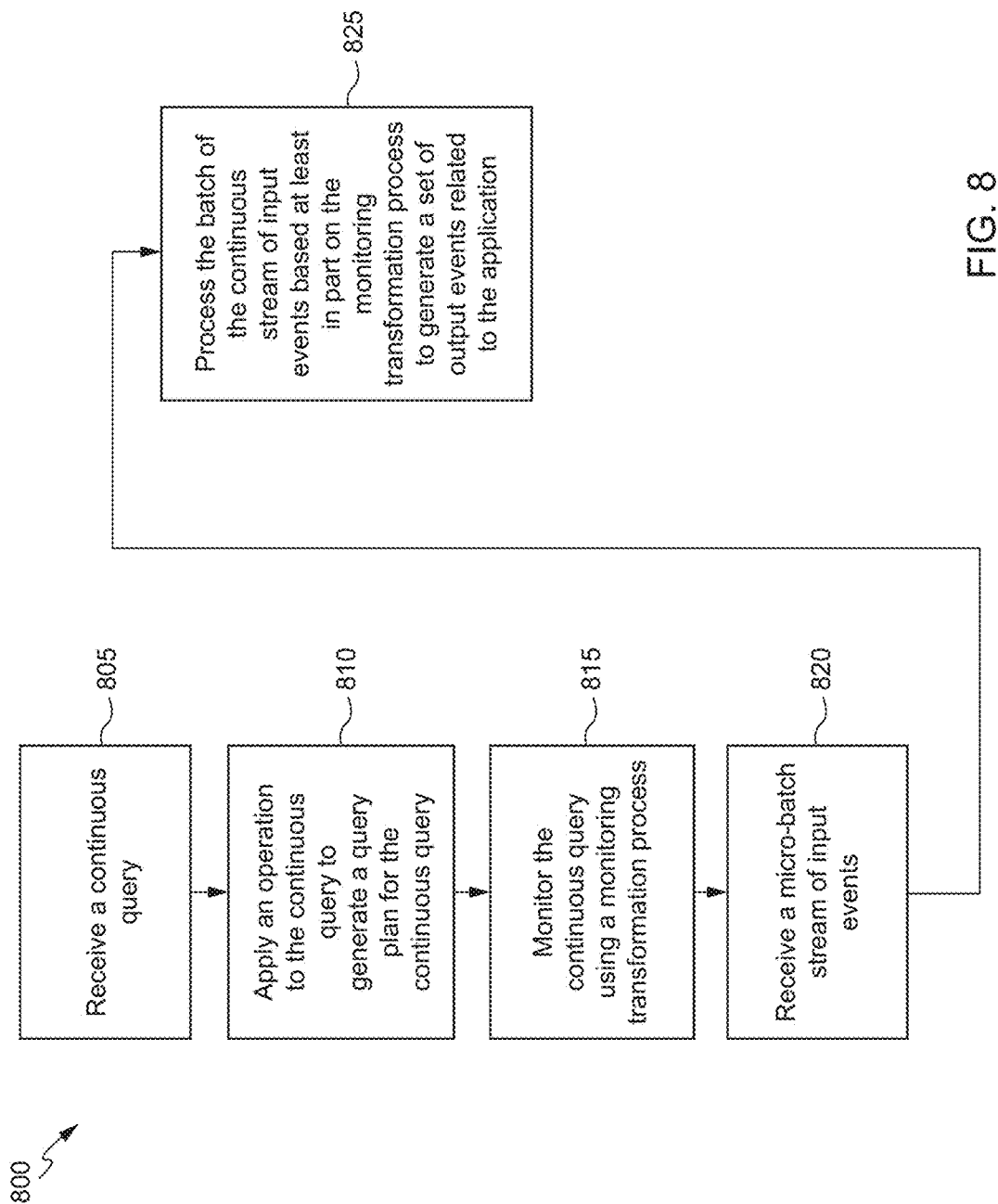
FIG. 8 shows a flowchart that illustrates processing of a micro-batching in accordance with an embodiment of the present disclosure.

FIGS. 4, 7, and 8 illustrate techniques for processing a micro-batching stream to support fully stateful query processing according to some embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIGS. 4, 7, and 8 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 4, 7, and 8 is not intended to be limiting. Other sequences of steps may also be performed according to alternative embodiments. For example, in alternative embodiments the steps outlined above may be performed in a different order. Moreover, the individual steps illustrated in FIGS. 4, 7, and 8 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4 shows a flowchart 400 that illustrates processing of a micro-batching stream to support fully stateful query processing implemented by embodiments of the present disclosure. In some embodiments, the processes depicted in flowchart 400 may be implemented by the event processing systems of FIGS. 1, 2, and 3. At step 405, a continuous query processing engine written in Continuous Query Language is launched. In some embodiments, a driver from a stream processing application launches the CQLEngine to one or more of Executors as long running tasks which never return. The CQLEngine keeps running and maintains the query state for a micro-batch stream. At step 410, a continuous query is received. In some embodiments, the query includes patter recognition. For example, a MATCH_RECOGNIZE clause and its sub-clauses in CQL can be invoked to perform pattern recognition in CQL queries. At step 415, an operation is applied to the continuous query to generate a query plan for the continuous query. The query plan (or query execution plan) is an ordered set of steps used to access data, for example, in a SQL relational database management system, for processing of the query or continuous query. In some embodiments, the operation is a DAG transformation and the query plan is a DAG query plan. A DAG transformation is a set of vertices and edges, where vertices represent the RDDs and the edges represent the operation to be applied on the RDD. At step 420, the query plan is transformed using a transformation algorithm to generate a transformed query plan. In various embodiments, the transformation algorithm is a CQL transformation. For example, in each instance that a micro-batch or RDD is operated upon to generate the query plan, a CQL transformation is executed. In some embodiments, the CQL transformation is added to the DAG transformation to generate the transformed query plan. At step 425, a micro-batch stream of input events related to an application is received. In some embodiments, Spark Streaming may discretize a continuous stream of data into tiny, sub-second micro-batches or a micro-batch stream. At step 430, the input events are processed based at least in part on the transformed query plan to generate a set of output events related to the application. In some embodiments, the processing is performed using a continuous query processing engine, and the processing comprises processing each of the input events incrementally to generate the output events. For example, when the transformation algorithm such as a CQL Transformation gets executed, the input events of a micro-batch are sent to a CQLEngine. The CQLEngine handles each input event in the micro-batch event-by-event, performs incremental computation on each input event in the micro-batch for the queries based at least in part on the transformed query plan, and creates output events for each input event in the micro-batch. As such, the stateful processing is performed by the CQL Engine. At step 435, the set of output events related to the application are stored in an output queue. In some embodiments, the output events are captured in the output queue while remaining events in the micro-batch are processed by the CQLEngine. At step 440, after each event in the micro-batch is processed, the output events in the output queue are returned and/or transmitted as the result of the continuous query.

Managing Snapshots and Application State in Micro-Batch Based Event Processing Systems In recent years, data stream management systems (DSMs) have been developed that can execute queries in a continuous manner over potentially unbounded, real-time data streams. Among the new DSMs, these systems generally employ micro-batching based stream processing in order to provide a combination of batch processing and stream processing from a single framework. An example of such a system is a Spark Streaming application running on the Spark® platform. Micro-batching stream processing has some shortcomings due to the nature of the design of the system where stateful processing can be complex. One such shortcoming is not being able to perform a 'pattern matching' operation. Pattern matching is an important feature that is desirable that Stream Processing system should support and Pattern Matching requires highly stateful processing in order to run state machines to detect patterns from an unbound stream of events.

In order to support fully stateful query processing, in one embodiment, the CQL Query Engine is added into the micro-batching stream processing, as described herein. The solution essentially combines Complex Event Processing (CEP) and Micro-batching stream processing. The stateful processing is processed by the CQL Engine which is a continuous query processing engine written in Continuous Query Language (CQL).

In certain situations, there may be more than one CQL engine in a cluster and each engine will need to create state snapshots for checkpointing individually. As such, there is a need for coordinating snapshot generation and managing snapshots such as retention of snapshots after micro-batch processing is completed.

Figure 5:
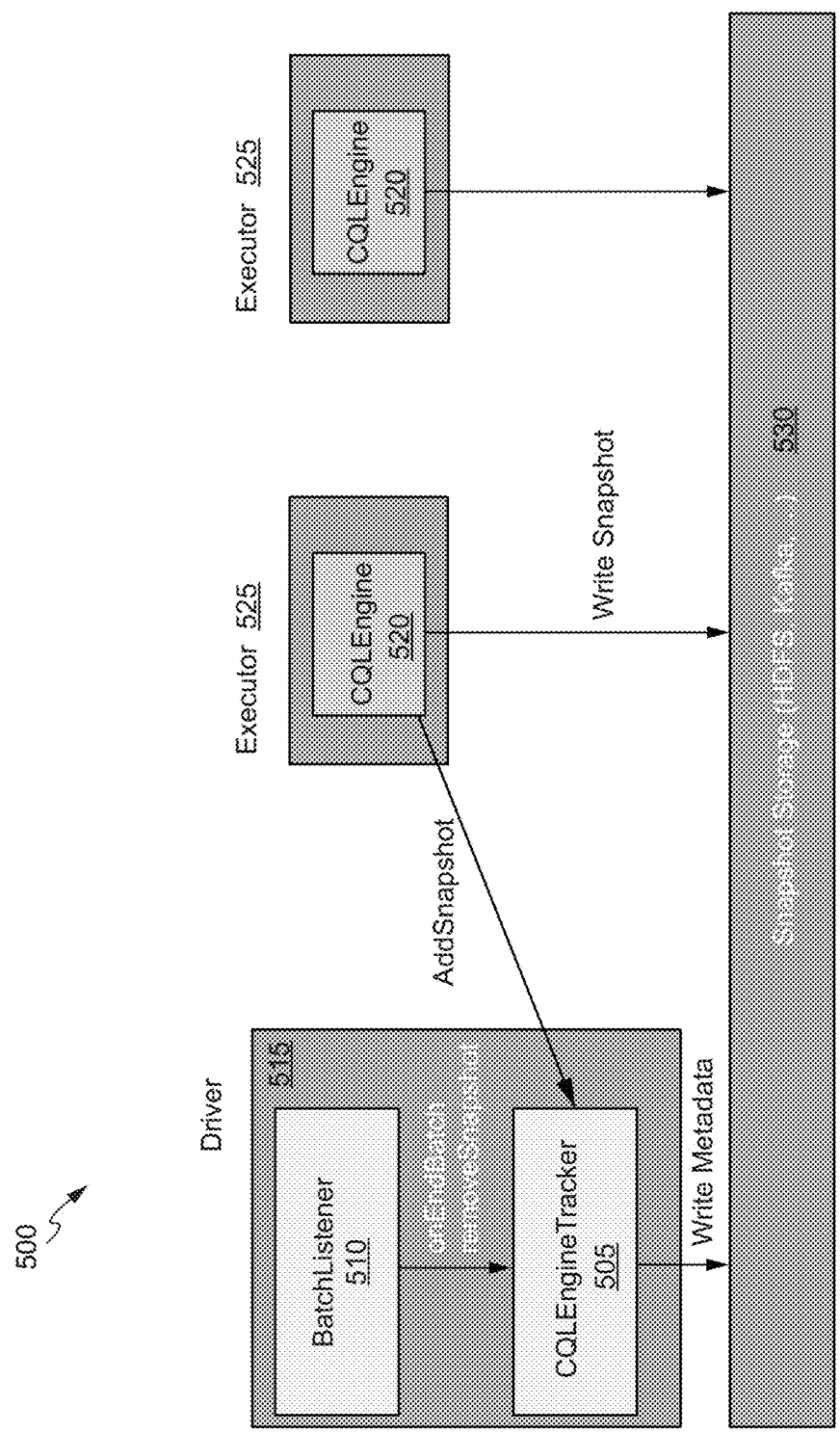
FIG. 5 is an example system or architecture in which a CQL Engine Tracker is implemented in accordance with an embodiment of the present disclosure.

FIG. 5 is an example system or architecture 500 in which a CQL Engine Tracker 605 can be implemented for coordinating snapshot generation and managing snapshots in accordance with an embodiment of the present disclosure. In various embodiments, the system or architecture 500 includes a CQL Engine Tracker 505 in communication with a listener 510. The CQL Engine Tracker 505 and listener 510 may be disposed in a driver 515. The CQL Engine Tracker 505 is configured to manage snapshots created from CQL Engines 520, which may be on one or more executors 525 in a cluster. In certain embodiments, the CQL Engine Tracker 505 may use two directory structures, the Snapshot Map and the Map to manage snapshots. The Snapshot Map directory structure can be used to directly access snapshot information from a given queryid, partition and time and a map. Snapshots Map may be used to find snapshots to recover or clean up. An exemplary data structure of the Snapshot Map directory structure is shown FIG. 6A. The Map directory structure: (queryId, partitionId, time)->mark. Map: (queryId, partitionId)->List of Snapshot(time,mark, fullFlag) in reverse order. An exemplary data structure of the Map directory structure is shown in FIG. 6B. The snapshots from the CQL Engines 520 and the metadata from the CQL Engine Tracker 505 may be written into the snap shot storage 530.

In an embodiment, the CQL Engine Tracker in conjunction with the CQL Engines may implement a snapshot management algorithm. In some embodiments, the snapshot management algorithm may include a process to add snapshots, a process to get snapshots, and a process to clean snapshots. In some embodiments, the AddSnapshot Process includes the following operations: (i) for managing snapshots, the primary structure uses a map of PartitionKey (queryId, partitionId) to the list of Snapshot(time, mark, full_flag) in reverse order; (ii) a CQLEngine invokes addSnapshot RPC to CQLEngineTracker after finishing the computation and creates a snapshot with queryId, partitionId, time, and snapshot mark information, and full_flag; (iii) AddSnapshot is invoked; (iv) a PartitionKey object is created with queryId and partitionId; (v) if there is no list for the partitionKey in the map, a new list is created, otherwise use the existing list; and (vi) a Snapshot object is created with time, mark, and full_flag.

In some embodiments, the GetSnapshots Process includes the following operations: (i) a CQL RDD (Resilient Distributed Dataset) invokes a getSnapshot RPC (Remote Procedure Call) with queryId, partitionId, and time to the CQLEngineTracker before starting the computation to get the list of snapshots to restore the state; (ii) GetSnapshots PartitionKey is created with queryId and partitionId; (iii) Snapshots is looked up from snapshots map with the partitionKey; (iv) if there is no stored snapshots map, return empty[Snapshot]; (v) Stack[Snapshot] is created, for each snapshot in the reverse ordered list; and (vi) if snapshot time is smaller than (time—batchDuration) add it to the stack, and convert the stack to list and return.

In some embodiments, the CleanSnapshots Process: includes the following operations: (i) once the batch is completed, it may be safe to remove snapshots; (ii) when the batch is completed, onEndBatch is invoked from the job scheduler, it invokes EndOfBatch RPC call with batch time; (iii) the algorithm is to remove all snapshots before the given batch time except the full snapshot; (iv) CleanSnapshots for each entry in snapshots map and for each snapshot in snapshot list; and (v) if (snapshot time is less than batch time) remove it from the map and also remove from the snapshot storage.

FIG. 7 shows a flowchart 700 that illustrates processing of a micro-batching stream to support fully stateful query processing implemented by embodiments of the present disclosure. In some embodiments, the processes depicted in flowchart 700 may be implemented by the event processing systems of FIGS. 1, 2, 3, and 5. At step 705, a micro-batch stream of input events related to an application is received. In some embodiments, Spark Streaming may discretize a continuous stream of data into tiny, sub-second micro-batches or a micro-batch stream. At step 710, the input events are processed using a continuous query processing engine to generate a set of output events related to the application. In some embodiments, processing comprises processing each of the input events incrementally to generate the output events. For example, when the transformation algorithm such as a CQL Transformation gets executed, the input events of a micro-batch are sent to a CQLEngine. The CQLEngine handles each input event in the micro-batch event-by-event, performs incremental computation on each input event in the micro-batch for the queries based at least in part on the transformed query plan, and creates output events for each input event in the micro-batch. As such, the stateful processing is performed by the CQL Engine. At step 715, a snapshot of a current state of a system is generated based at least in part on the output set of events related to the application. In some embodiments, the snapshot is generated using a snapshot management algorithm implemented by the CQL engine. In certain embodiments, the snapshot management algorithm may include a process to add snapshots, a process to get snapshots, and a process to clean snapshots. At step 720, a first directory structure is generated to access snapshot information associated with the snapshot of the current state of the system. In some embodiments, the first directory structure is a Snapshot Map directory structure. At step 725, a second directory structure is generated to generate a list of snapshots associated with the current state of the system. In some embodiments, the second directory structure is a Map directory structure. At step 730, a process is determined based at least in part on the snapshot management algorithm to generate, add, or clean a list of snapshots pertaining to the current state of the system. In some embodiments, when the snapshot management algorithm includes a process to add snapshots, the process is determined to add a list of snapshots pertaining to the current state of the system. In some embodiments, when the snapshot management algorithm includes a process to get snapshots, the process is determined to get a list of snapshots pertaining to the current state of the system. In some embodiments, when the snapshot management algorithm includes a process to clean snapshots, the process is determined to clean a list of snapshots pertaining to the current state of the system. As should be understood, the processes may further include the steps described with respect to FIG. 4, for example, launching a continuous query processing engine, applying an operation to a continuous query to generate a query plan for the continuous query, transforming the query plan to generate a transformed query plan, processing the input events based at least in part on the transformed query plan to generate a set of output events, storing the set of output events related to the application in an output queue, and after each event in the micro-batch is processed, the output events in the output queue may be returned and/or transmitted as the result of the continuous query.

Embodiments of the present disclosure provide stateful components that maintain the running state in a Spark Streaming system, provide fully stateful CQLEngines within micro-batching stream processing, manage snapshots created from distributed CQLEngines, and provide a retention algorithm for handling incremental snapshots. The disclosed techniques allow high availability even after adding event-by-event CEP processing into a micro-batching based stream processing.

Non-Intrusive Monitoring Output of Stages in Spark Streaming

In recent years, data stream management systems (DSMs) have been developed that can execute queries in a continuous manner over potentially unbounded, real-time data streams. Among the new DSMs, these systems generally employ micro-batching based stream processing in order to provide a combination of batch processing and stream processing from a single framework. An example of such a system is a Spark Streaming application running on the Spark® platform.

Typical applications in DSMS are designed as a "topology" in the shape of a DAG (Directly Acyclic Graph) of operations or transformations. The topology acts as a data transformation pipeline. Most stream processing systems (e.g., Spark Streaming systems) provide a way to quickly deploy the topology for an application to a cluster of machines and are able to view the results immediately. The fast turn-around cycle of such deployment is important for making changes to the application. If the turn-around cycle is fast enough, the user can see the results without waiting for deployment delays. This is referred to as 'Stream Exploration.'

In the Stream Exploration mode, customers generally develop a business application incrementally by adding new components to an existing topology or data transformation pipeline. In such an exploration mode, it is important to see the immediate output from the changes and also intermediate outputs from each stage in the pipeline.

In current DSMS such as Spark® Streaming or Apache® Flink, the topology is written using programming languages such as Java, Scala, or Closure. As the result, when an application developer wants to monitor intermediate outputs from one transformation, the developer has to change the program and add an output operation. This is not only cumbersome but also intrusive as all output operations usually become additional jobs for some systems like Spark Streaming. To make the situation more complex, there is currently no mechanism to turn output monitoring after it is put into an application while the application is running.

In an embodiment, a monitoring transformation process is disclosed that has the following features: (i) pass-through transformation which generates an output to the next pipeline without adding any transformation while sending outputs to the specified destination, (ii) monitoring output is configured in an application, and (iii) monitoring output can be turned off or changed while running an application.

In an embodiment, the above features can be implemented using the following example:

```
val s1 = cc.cql(inputs, "select * from stream")
val producerConfig = KafkaMonitorConfig(outputTopic, brokerList)
val s1output = s1.monitor(KafkaMonitorOutput(producerConfig));
val s2output = cc.cql(s1output, "select * from s1")
```

The flow of above example may be described as follows: (i) by invoking 'monitor' to 's1' DStream, MonitorDStream is added to a DAG after CQLDStream of 's1'. MonitorDStream carries information about KafkaMonitorOutput with configuration; (ii) the job generation steps create MonitorRDD from MonitorDStream; (iii) when the job runs, MonitorRDD.compute is invoked; and (iv) a pathThroughIterator writes output to the configured monitor output while returning the tuple to the next pipeline.

The flow of turning off monitoring output or updating the configuration may be implemented as follows: (i) a REST service runs from the application to get the update; (ii) the generated MonitorDStream instance for the application and stage is stored in the application and it can be found with appname and stagename as a key; (iii) the REST request such as PUT operation on '/monitoroutput/<appname>/<stagename>/off or POST operation on '/monitoroutput/<appname>/<stagename>/configure with new configuration will be delegated to 'MonitorOutputManager' component; (iv) the MonitorOutputManager will change the settings or configuration of MonitorDStream object instance; and (v) the next job run by job runner will be affected by the change.

FIG. 8 shows a flowchart 800 that illustrates processing of a micro-batching stream to support fully stateful query processing implemented by embodiments of the present disclosure. In some embodiments, the processes depicted in flowchart 800 may be implemented by the event processing systems of FIGS. 1, 2, and 3. At step 805, a continuous query is received. In some embodiments, the query includes patter recognition. For example, a MATCH_RECOGNIZE clause and its sub-clauses in CQL can be invoked to perform pattern recognition in CQL queries. At step 810, an operation is applied to the continuous query to generate a query plan for the continuous query. The query plan (or query execution plan) is an ordered set of steps used to access data, for example, in a SQL relational database management system, for processing of the query or continuous query. In some embodiments, the operation is a DAG transformation and the query plan is a DAG query plan. A DAG transformation is a set of vertices and edges, where vertices represent the RDDs and the edges represent the operation to be applied on the RDD. At step 815, the continuous query is monitored using a monitoring transformation process. For example, a monitoring transformation process may have the following features: (i) pass-through transformation which generates an output to the next pipeline without adding any transformation while sending outputs to the specified destination, (ii) monitoring output is configured in an application, and (iii) monitoring output can be turned off or changed while running an application. At step 820, a micro-batch stream of input events related to an application is received. In some embodiments, Spark Streaming may discretize a continuous stream of data into tiny, sub-second micro-batches or a micro-batch stream. At step 825, the input events are processed based at least in part on the monitoring transformation process to generate a set of output events related to the application. In some embodiments, the processing is performed using a continuous query processing engine, and the processing comprises processing each of the input events incrementally to generate the output events. For example, when the monitoring transformation process gets executed, the input events of a micro-batch are sent to a CQLEngine. The CQLEngine handles each input event in the micro-batch event-by-event, performs incremental computation on each input event in the micro-batch for the queries based at least in part on the monitoring transformation process, and creates output events for each input event in the micro-batch. As such, the stateful processing is performed by the CQL Engine. The set of output events related to the application are stored in an output queue. In some embodiments, the output events are captured in the output queue while remaining events in the micro-batch are processed by the CQLEngine. As should be understood, the processes may further include the steps described with respect to FIG. 4, for example, launching a continuous query processing engine, and after each event in the micro-batch is processed, the output events in the output queue may be returned and/or transmitted as the result of the continuous query.

Embodiments of the present disclosure provide a non-intrusive output monitoring technique with Spark Streaming and a technique to turn on/off intermediate outputs from a running Spark Streaming application. In addition, the disclosed technique enables adding intermediate output monitoring for Stream Exploration and changing the outputs.

Illustrative Systems

Figure 9:
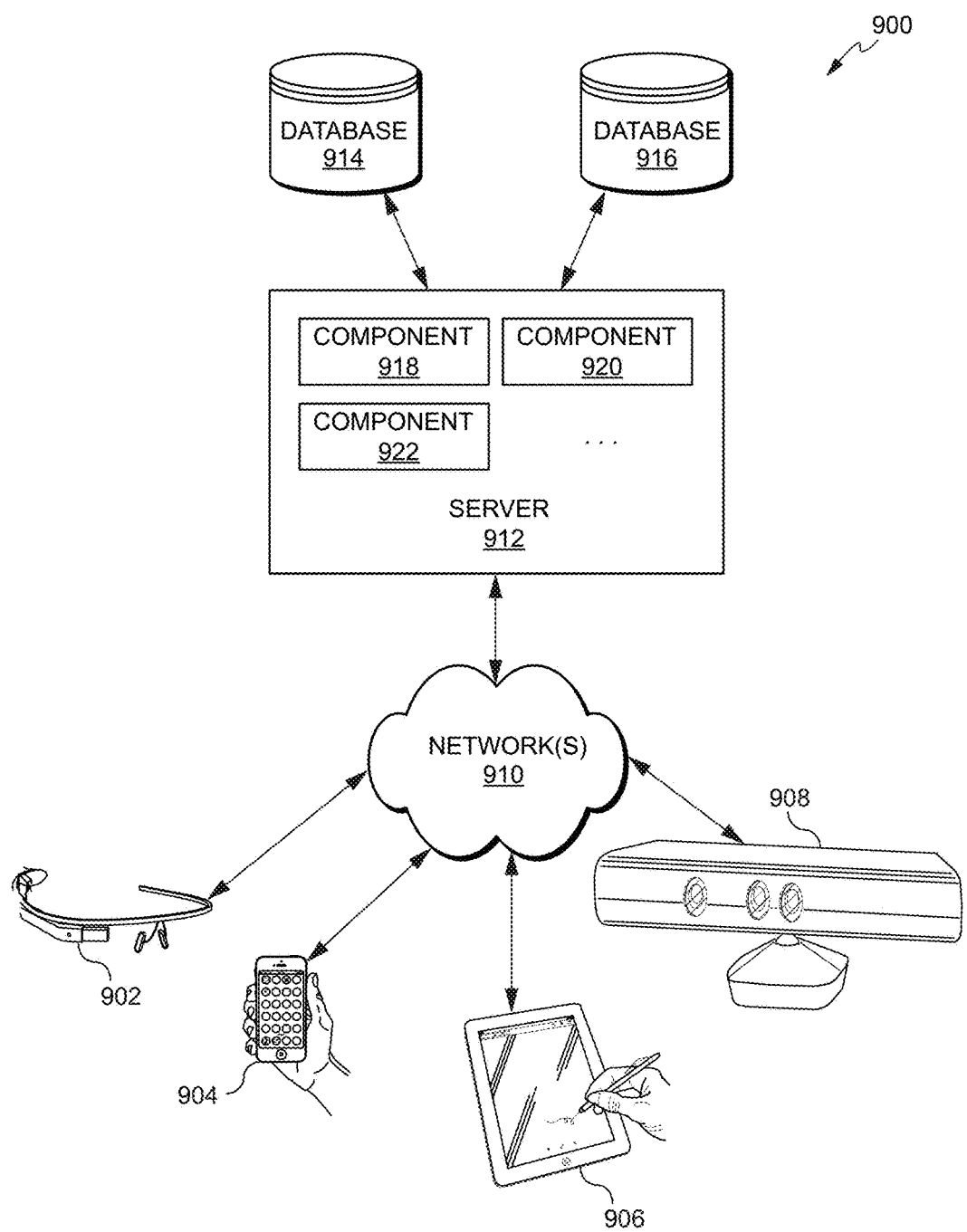
FIG. 9 depicts a simplified diagram of a distributed system for implementing an embodiment of the present disclosure.

FIGS. 9-7 illustrate aspects of example environments for implementing aspects of the present disclosure in accordance with various embodiments. FIG. 9 depicts a simplified diagram of a distributed system 900 for implementing an embodiment of the present disclosure. In the illustrated embodiment, the distributed system 900 includes one or more client computing devices 902, 904, 906, and 908, which are configured to execute and operate a client application such as a web browser, proprietary client (e.g., Oracle Forms), or the like over one or more network(s) 910. The server 912 may be communicatively coupled with the remote client computing devices 902, 904, 906, and 908 via network 910.

In various embodiments, the server 912 may be adapted to run one or more services or software applications such as services and applications that provide identity management services. In certain embodiments, the server 912 may also provide other services or software applications can include non-virtual and virtual environments. In some embodiments, these services may be offered as web-based or cloud services or under a Software as a Service (SaaS) model to the users of the client computing devices 902, 904, 906, and/or 908. Users operating the client computing devices 902, 904, 906, and/or 908 may in turn utilize one or more client applications to interact with the server 912 to utilize the services provided by these components.

In the configuration depicted in FIG. 9, the software components 918, 920 and 922 of system 900 are shown as being implemented on the server 912. In other embodiments, one or more of the components of the system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

The client computing devices 902, 904, 906, and/or 908 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 910.

Although distributed system 900 in FIG. 9 is shown with four client computing devices, any number of client computing devices may be supported. Other devices, such as devices with sensors, etc., may interact with the server 912.

The network(s) 910 in the distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 912 can include one or more virtual machines running virtual operating systems, or other computing architectures involving virtualization. One or more flexible pools of logical storage devices can be virtualized to maintain virtual storage devices for the server. Virtual networks can be controlled by the server 912 using software defined networking. In various embodiments, the server 912 may be adapted to run one or more services or software applications described in the foregoing disclosure. For example, the server 912 may correspond to a server for performing processing as described above according to an embodiment of the present disclosure.

The server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 912 may include one or more applications to analyze and consolidate data feeds and/or event updates received from users of the client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 912 may also include one or more applications to display the data feeds and/or real-time events via one or more display devices of the client computing devices 902, 904, 906, and 908.

The distributed system 900 may also include one or more databases 914 and 916. These databases may provide a mechanism for storing information such as user identity information, and other information used by embodiments of the present disclosure. Databases 914 and 916 may reside in a variety of locations. By way of example, one or more of databases 914 and 916 may reside on a non-transitory storage medium local to (and/or resident in) the server 912. Alternatively, the databases 914 and 916 may be remote from the server 912 and in communication with the server 912 via a network-based or dedicated connection. In one set of embodiments, the databases 914 and 916 may reside in a storage-area network (SAN). Similarly, any necessary files for performing the functions attributed to the server 912 may be stored locally on the server 912 and/or remotely, as appropriate. In one set of embodiments, the databases 914 and 916 may include relational databases, such as databases provided by Oracle, that are adapted to store, update, and retrieve data in response to SQL-formatted commands.

Figure 10:
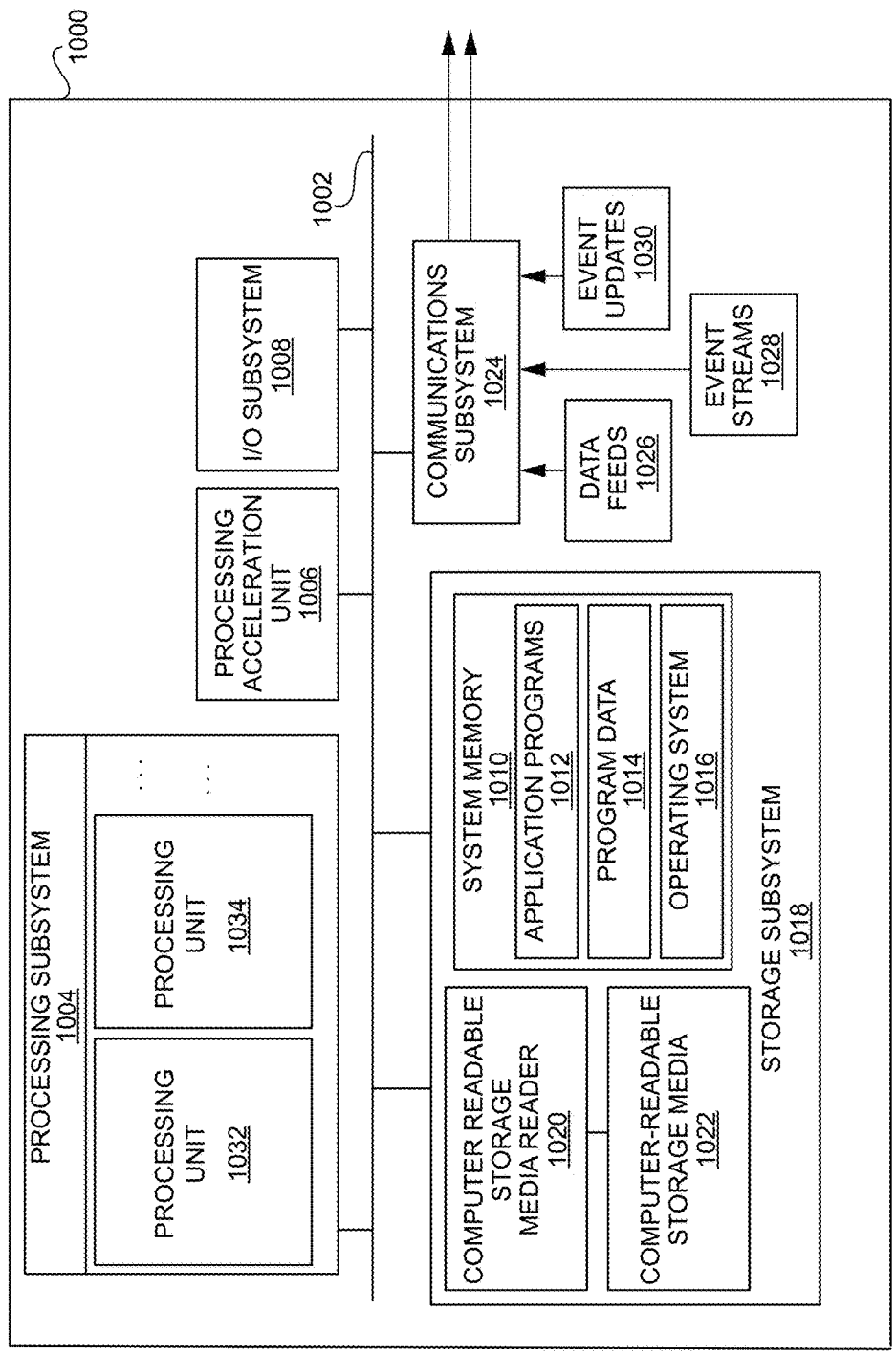
FIG. 10 is a simplified block diagram of one or more components of a system environment by which services provided by one or more components of an embodiment system may be offered as cloud services, in accordance with an embodiment of the present disclosure.

FIG. 10 illustrates an exemplary computer system 1000 that may be used to implement an embodiment of the present disclosure. In some embodiments, computer system 1000 may be used to implement any of the various servers and computer systems described above. As shown in FIG. 10, computer system 1000 includes various subsystems including a processing subsystem 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1010 including potentially on one or more storage devices. Through suitable programming, processing subsystem 1004 can provide various functionalities described above for dynamically modifying documents (e.g., webpages) responsive to usage patterns.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. Additionally, communication subsystem 1024 may be used to communicate notifications of successful logins or notifications to re-enter a password from the privileged account manager to the requesting users.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

Figure 11:
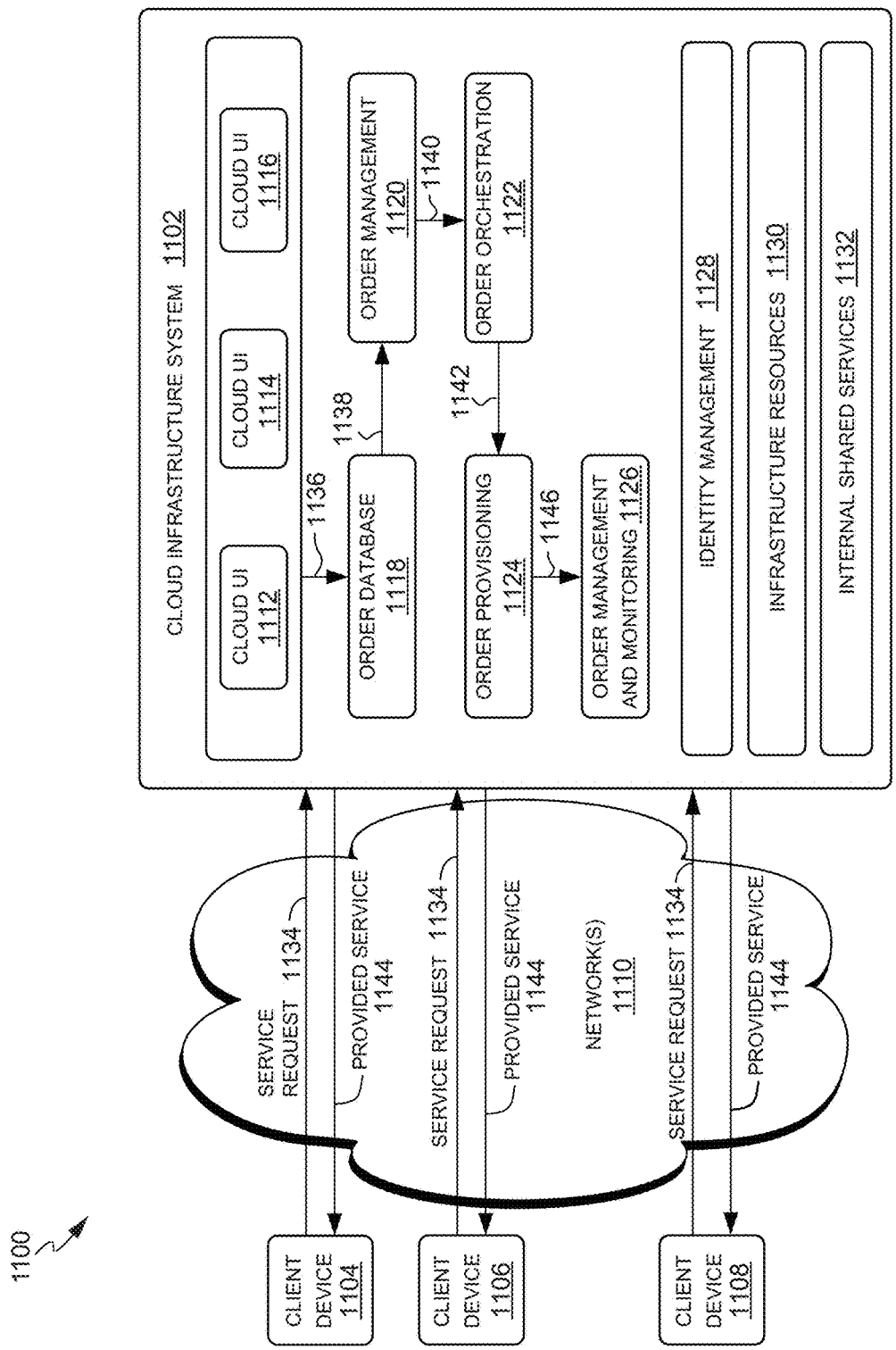
FIG. 11 illustrates an example computer system that may be used to implement an embodiment of the present disclosure.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the disclosure. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 902, 904, 906, and 908.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 910.

Cloud infrastructure system 1102 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 302. At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method for processing of a micro-batching stream to support fully stateful query processing, comprising:
receiving, by a computing device, a continuous query;

applying, by the computing device, a transformation to the continuous query to generate a query plan for the continuous query;

monitoring, by the computing device, the continuous query using a monitoring transformation process;

receiving, by the computing device, a micro-batch stream of input events related to an application; and processing, by the computing device, the input events of the micro-batch stream based at least in part on the monitoring transformation process to generate a set of output events related to the application, wherein the processing is performed using a continuous query processing engine, and the processing comprises: sending the input events of the micro-batch stream to the continuous query processing engine; performing, by the continuous query processing engine, incremental computation on each of the input events of the micro-batch stream for the continuous query based at least in part on the monitoring transformation process; and creating, by the continuous query processing engine, output events for each of the input events of the micro-batch stream, wherein the set of output events comprise the output events for each of the input events of the micro-batch stream.

2. The method of claim 1, wherein transformation is a Directly Acyclic Graph (DAG) transformation.

3. The method of claim 2, further comprising storing, by the computing device, the set of output events related to the application in an output queue; and transmitting, by the computing device, the output events in the output queue when all of the input events have been processed.

4. The method of claim 3, wherein the micro-batch stream comprises micro-batches of data or Resilient Distributed Datasets (RDDs), and the DAG transformation is a set of vertices and edges, wherein the vertices represent the RDDs and the edges represent an operation to be applied on the RDDs.

5. The method of claim 4, wherein the processing each of the input events comprises performing a computation on each of the input based at least in part on a transformed query plan.

6. The method of claim 5, wherein the continuous query includes pattern matching.

7. A system, comprising:

a memory configured to store computer-executable instructions; and a processor configured to access the memory and execute the computer-executable instructions to:

receive a continuous query;

apply a transformation to the continuous query to generate a query plan for the continuous query;

monitor the continuous query using a monitoring transformation process;

receive a micro-batch stream of input events related to an application; and process the input events of the micro-batch stream based at least in part on the monitoring transformation process to generate a set of output events related to the application, wherein the processing is performed using a continuous query processing engine, and the processing comprises: sending the input events of the micro-batch stream to the continuous query processing engine; performing, by the continuous query processing engine, incremental computation on each of the input events of the micro-batch stream for the continuous query based at least in part on the monitoring transformation process; and creating, by the continuous query processing engine, output events for each of the input events of the micro-batch stream, wherein the set of output events comprise the output events for each of the input events of the micro-batch stream.

8. The system of claim 7, wherein transformation is a Directly Acyclic Graph (DAG) transformation.

9. The system of claim 8, wherein the computer-executable instructions are further executable to store the set of output events related to the application in an output queue; and transmit the output events in the output queue when all of the input events have been processed.

10. The system of claim 9, wherein the micro-batch stream comprises micro-batches of data or Resilient Distributed Datasets (RDDs), and the DAG transformation is a set of vertices and edges, wherein the vertices represent the RDDs and the edges represent an operation to be applied on the RDDs.

11. The system of claim 10, wherein the processing each of the input events comprises performing a computation on each of the input based at least in part on a transformed query plan.

12. The system of claim 11, wherein the continuous query includes pattern matching.

13. A computer-readable medium storing computer-executable code that, when executed by a processor, cause the processor to perform operations comprising:

receiving a continuous query;

applying a transformation to the continuous query to generate a query plan for the continuous query;

monitoring the continuous query using a monitoring transformation process;

receiving a micro-batch stream of input events related to an application; and processing the input events of the micro-batch stream based at least in part on the monitoring transformation process to generate a set of output events related to the application, wherein the processing is performed using a continuous query processing engine, and the processing comprises: sending the input events of the micro-batch stream to the continuous query processing engine; performing, by the continuous query processing engine, incremental computation on each of the input events of the micro-batch stream for the continuous query based at least in part on the monitoring transformation process; and creating, by the continuous query processing engine, output events for each of the input events of the micro-batch stream, wherein the set of output events comprise the output events for each of the input events of the micro-batch stream.

14. The computer-readable medium of claim 13, wherein transformation is a Directly Acyclic Graph (DAG) transformation.

15. The computer-readable medium of claim 14, wherein the operations further comprise storing the set of output events related to the application in an output queue; and transmitting the output events in the output queue when all of the input events have been processed.

16. The computer-readable medium of claim 15, wherein the micro-batch stream comprises micro-batches of data or Resilient Distributed Datasets (RDDs), and the DAG transformation is a set of vertices and edges, wherein the vertices represent the RDDs and the edges represent an operation to be applied on the RDDs.

17. The computer-readable medium of claim 16, wherein the continuous query includes pattern matching.

* * * * *